(12) United States Patent
Grube et al.

(10) Patent No.: US 9,081,714 B2
(45) Date of Patent: *Jul. 14, 2015

(54) UTILIZING A DISPERSED STORAGE NETWORK ACCESS TOKEN MODULE TO STORE DATA IN A DISPERSED STORAGE NETWORK MEMORY

(75) Inventors: Gary W. Grube, Barrington Hills, IL (US); Timothy W. Markison, Mesa, AZ (US); Greg Dhuse, Chicago, IL (US); Jason K. Resch, Chicago, IL (US); Ilya Volvovski, Chicago, IL (US); Wesley Leggette, Oak Park, IL (US)

(73) Assignee: Cleversafe, Inc., Chicago, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 13/347,140

(22) Filed: Jan. 10, 2012

(65) Prior Publication Data

US 2012/0198536 A1   Aug. 2, 2012

Related U.S. Application Data

(60) Provisional application No. 61/438,490, filed on Feb. 1, 2011.

(51) Int. Cl.
*G06F 11/10* (2006.01)
*G06F 11/14* (2006.01)
(Continued)

(52) U.S. Cl.
CPC ............ *G06F 11/1076* (2013.01); *G06F 3/06* (2013.01); *G06F 3/0604* (2013.01); *G06F 3/067* (2013.01); *G06F 3/0619* (2013.01); *G06F 3/0665* (2013.01); *G06F 11/00* (2013.01);
(Continued)

(58) Field of Classification Search
CPC . G06F 11/00; G06F 11/1008; G06F 11/1076; G06F 11/1412; G06F 11/1446; G06F 11/1448; G06F 15/17331; G06F 21/805; G06F 3/06; G06F 3/0604; G06F 3/0619; G06F 3/0665; G06F 3/067; H04L 67/1097; H04L 9/085
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Lauritsen, Rasmus W. "Backups with Computational Secret Sharing," University of Aarhus, Apr. 9, 2008.*

(Continued)

*Primary Examiner* — Darren B Schwartz
(74) *Attorney, Agent, or Firm* — Garlick & Markison; Timothy W. Markison

(57) ABSTRACT

A method for storing data begins with determining, by a computing device, where to store the data and continues with managing, by a dispersed storage network (DSN) access token module, a pairing between the DSN access token module and the computing device. The method continues with sending, by the computing device, at least a portion of the data to the DSN access token module and encoding, by the DSN access token module, the at least a portion of the data using a dispersed storage error encoding function to produce one or more sets of encoded data slices. The method continues with sending, by the DSN access token module, the one or more sets of encoded data slices and storage information to the computing device and sending, by the computing device, the one or more sets of encoded data slices to the DSN memory for storage therein.

17 Claims, 21 Drawing Sheets

(51) Int. Cl.
*G06F 11/00* (2006.01)
*G06F 3/06* (2006.01)
*G06F 15/173* (2006.01)
*H04L 9/08* (2006.01)
*H04L 29/08* (2006.01)
*G06F 21/80* (2013.01)

(52) U.S. Cl.
CPC ........ *G06F11/1008* (2013.01); *G06F 11/1412* (2013.01); *G06F 11/1446* (2013.01); *G06F 11/1448* (2013.01); *G06F 15/17331* (2013.01); *H04L 9/085* (2013.01); *H04L 67/1097* (2013.01); *G06F 21/805* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,631,449 B1 | 10/2003 | Borril |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,376,805 B2 | 5/2008 | Stroberger et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0216813 A1 | 9/2005 | Cutts et al. |
| 2005/0229069 A1 | 10/2005 | Hassner |
| 2005/0246393 A1 | 11/2005 | Coates et al. |
| 2005/0273686 A1 | 12/2005 | Turner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0223706 A1* | 9/2007 | Gantman et al. ............... 380/286 |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0011061 A1* | 1/2010 | Hudson et al. ................ 709/204 |
| 2010/0023524 A1 | 1/2010 | Gladwin et al. |
| 2010/0037056 A1* | 2/2010 | Follis et al. .................... 713/171 |
| 2010/0199089 A1* | 8/2010 | Vysogorets et al. .......... 713/168 |
| 2011/0173162 A1* | 7/2011 | Anderson et al. .............. 707/692 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

(56) References Cited

OTHER PUBLICATIONS

Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
International Search Report and Written Opinion for Application No. PCT/US2012/023311, dated Apr. 5, 2012; 7 pgs.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

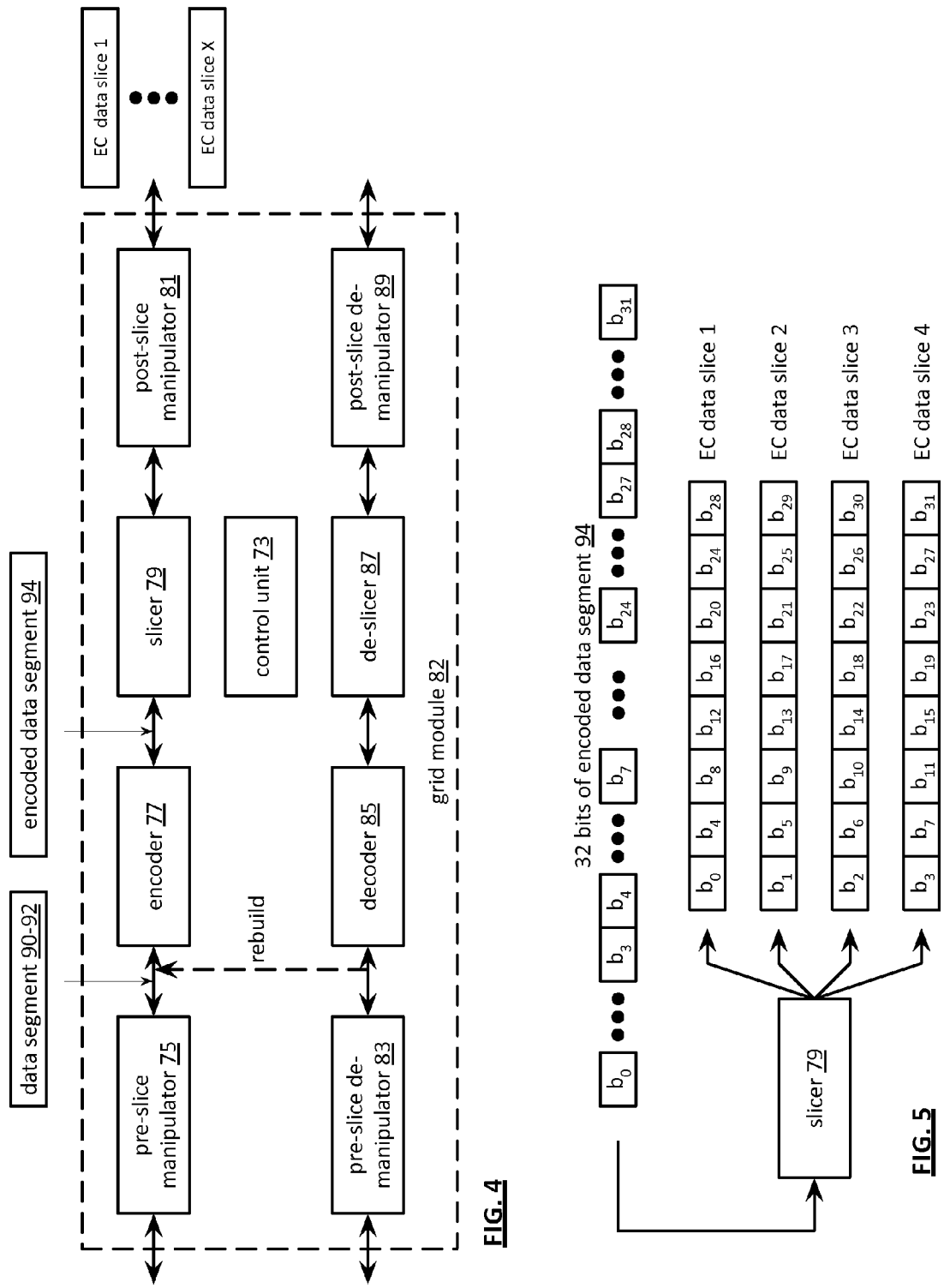

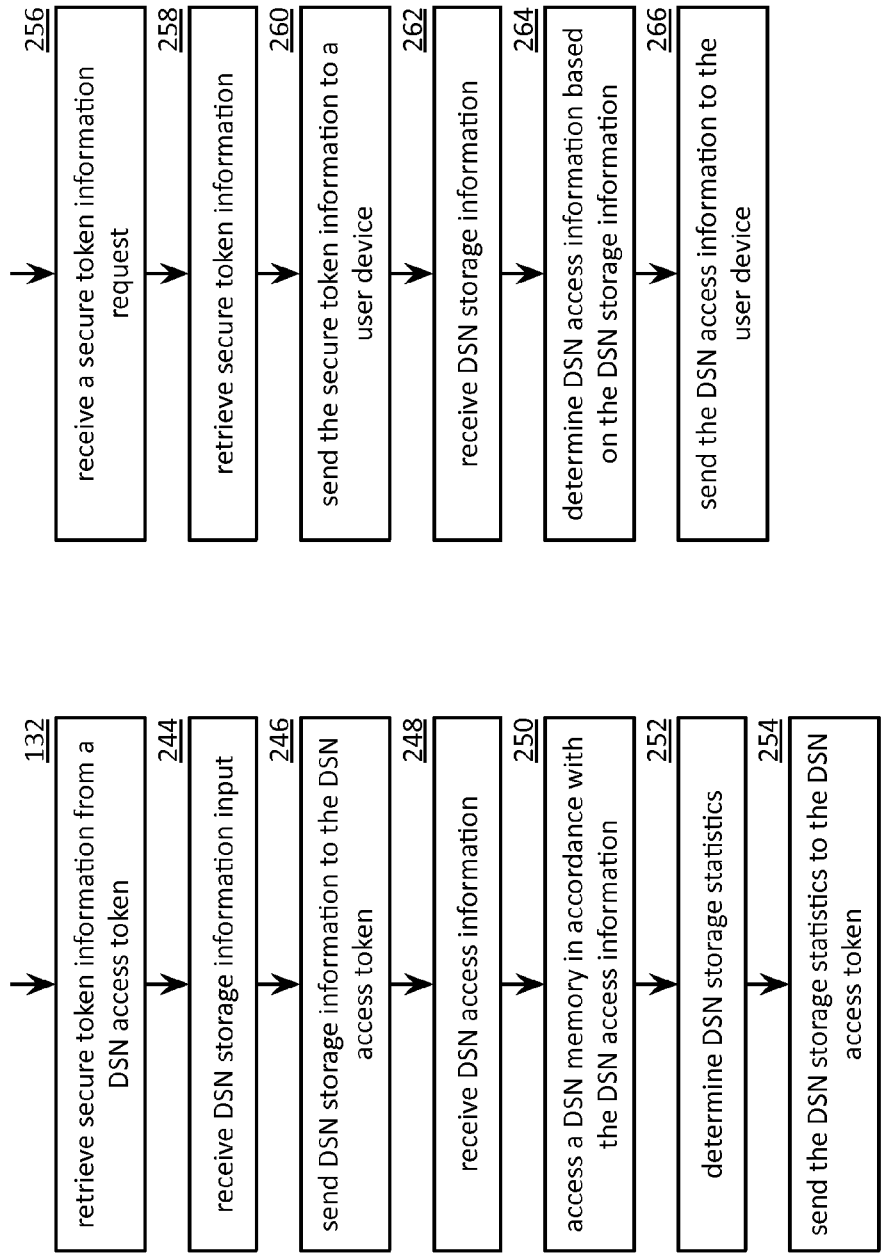

UTILIZING A DISPERSED STORAGE NETWORK ACCESS TOKEN MODULE TO STORE DATA IN A DISPERSED STORAGE NETWORK MEMORY

CROSS REFERENCE TO RELATED PATENTS

The present U.S. Utility patent application is claiming priority pursuant to 35 U.S.C. §119(e) to U.S. Provisional Application No. 61/438,490, entitled "DISPERSED STORAGE NETWORK ACCESS TOKEN," filed Feb. 1, 2011, which is incorporated herein by reference in its entirety and made part of the present U.S. Utility patent application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the invention;

FIG. 5 is a diagram of an example embodiment of error coded data slice creation in accordance with the invention;

FIG. 10A is a flowchart illustrating another example of accessing a dispersed storage network (DSN) in accordance with the invention;

FIG. 10B is a flowchart illustrating an example of determining dispersed storage network (DSN) access information in accordance with the invention;

DETAILED DESCRIPTION OF THE INVENTION

Figure 1:
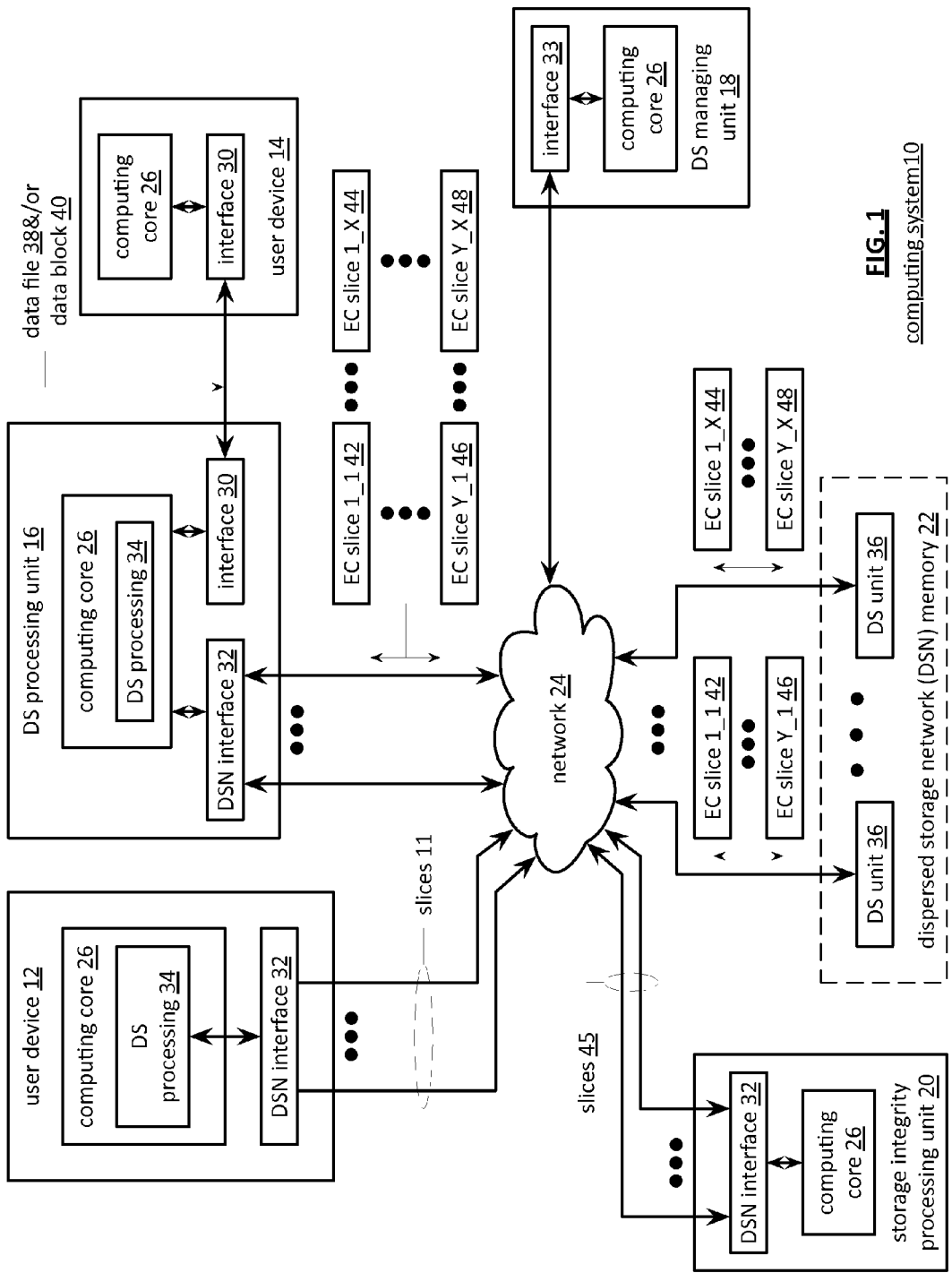
FIG. 1 is a schematic block diagram of an embodiment of a computing system in accordance with the invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the user device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
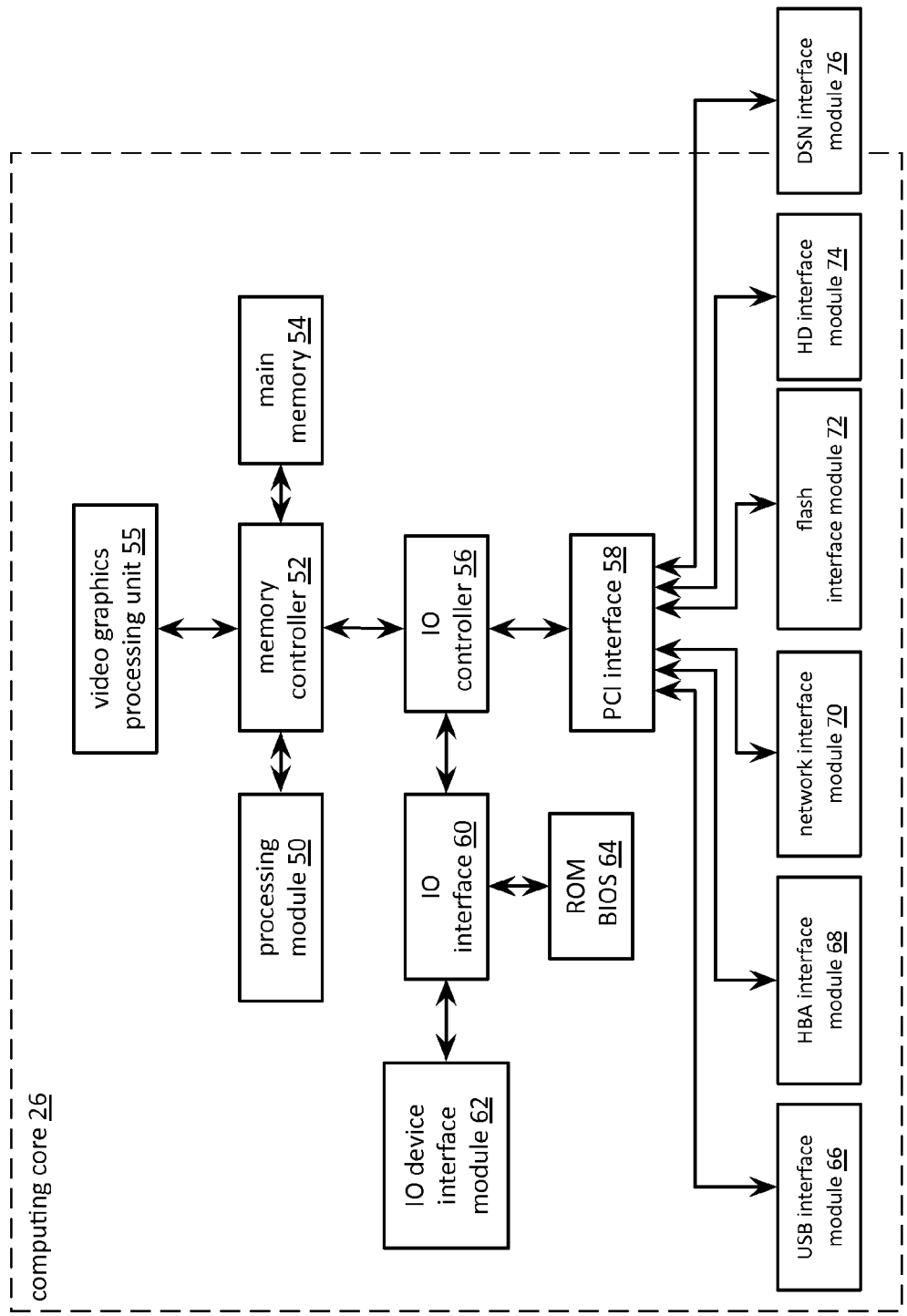
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
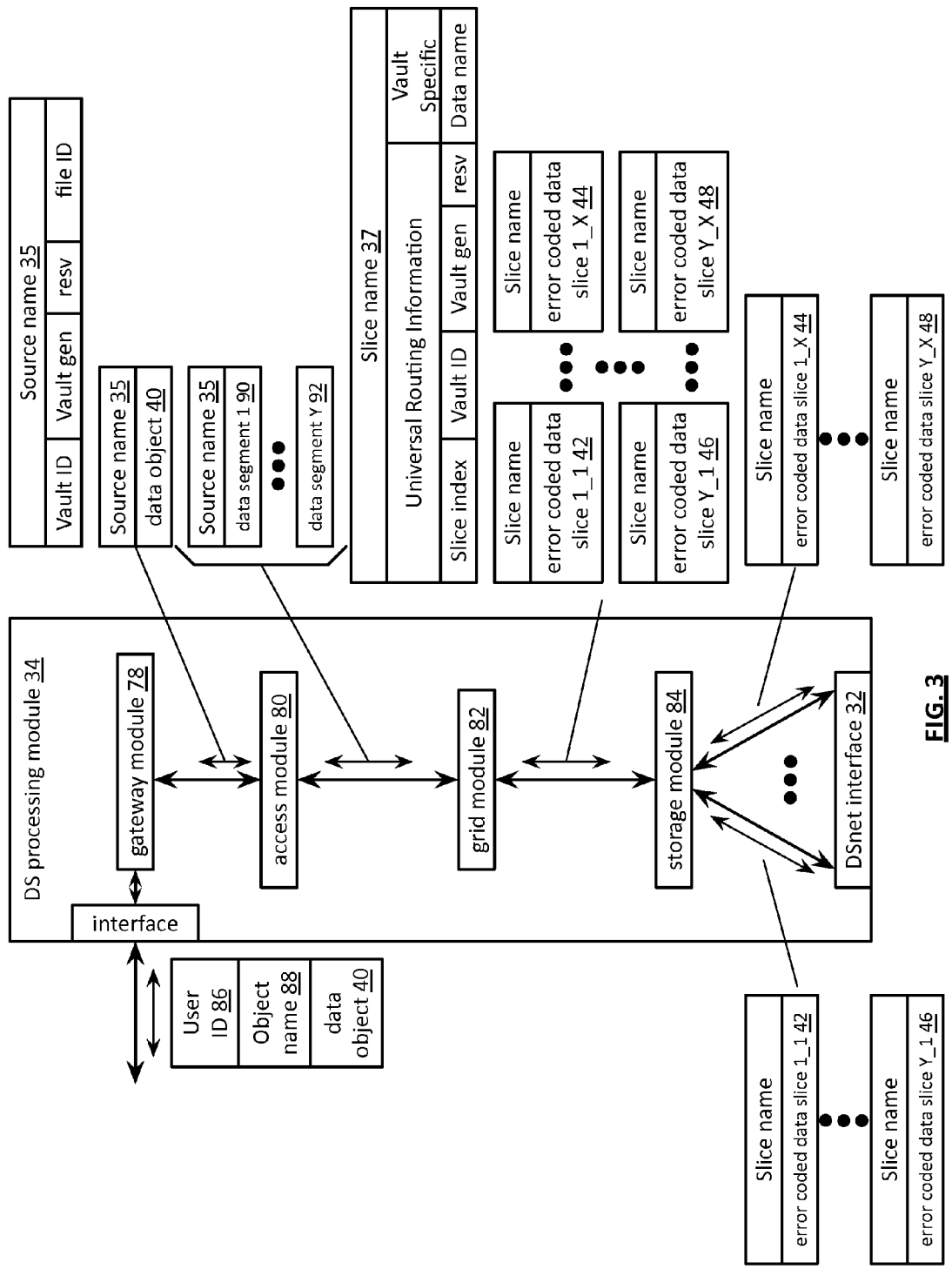
FIG. 3 is a schematic block diagram of an embodiment of a distributed storage processing unit in accordance with the invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
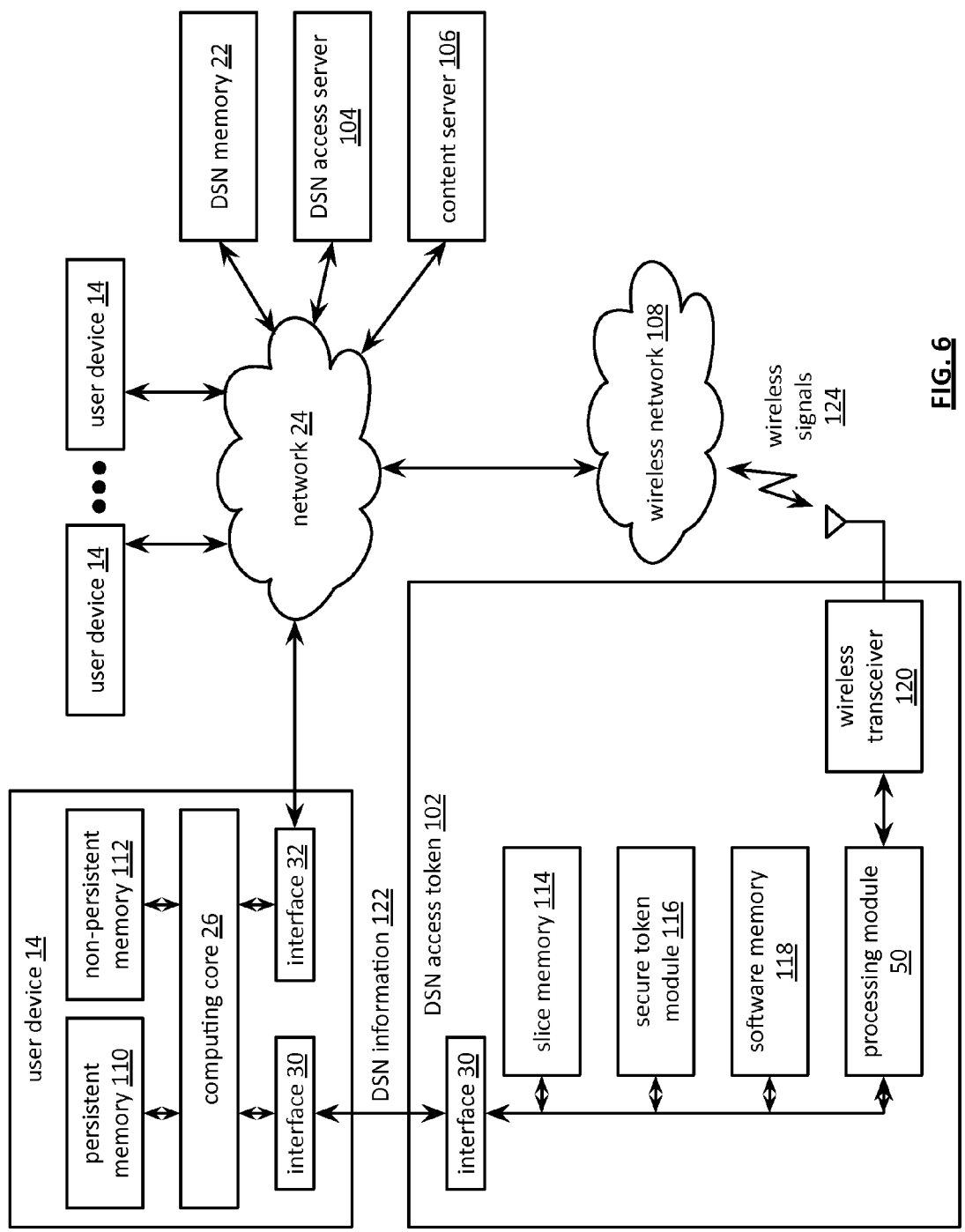
FIG. 6 is a schematic block diagram of another embodiment of a computing system in accordance with the invention.

FIG. 6 is a schematic block diagram of another embodiment of a computing system that includes a plurality of user devices 14, a network 24, a dispersed storage network (DSN) memory 22, a DSN access server 104, a content server 106, a wireless network 108, and a DSN access token module 102. The user device includes an interface 30, an interface 32, a computing core 26, a persistent memory 110, and a non-persistent memory 112. The persistent memory 110 includes a memory type such that data persists when the persistent memory 110 receives no power (e.g., a disk drive, flash memory). The non-persistent memory 112 includes a memory type such that data does not persist when the non-persistent memory does not receive power (e.g., random access memory (RAM)).

In an embodiment, the DSN access token module 102 includes an interface 30, a slice memory 114, a secure token module 116, a software memory 118, a processing module 50, and a wireless transceiver 120. The slice memory 114 includes memory to store one or more of encoded data slices, slice names, slice integrity information, and slice location information. The secure token module 116 includes memory and/or memory and an associated processing module utilized to store and retrieve secure token information. The secure token module 116 provides access to the secure token information via one or more of a retrieval utilizing a secure token information address, receiving a read request message that includes the secure token information address, and receiving a read request message that includes the secure token information address and a secure token access credential. The secure token information includes one or more of access credentials, encryption algorithm information, a private key, a public key, a shared key, DSN addressing information, a vault identifier (ID), a user ID, storage payment information, storage payment plan information, storage credits, a DSN provider list, a location of dispersed storage (DS) processing software, dispersed storage error coding parameters, a storage payment alert, DSN access information, DS processing software redistribution information, encoded data slice storage rights, and data storage rights. The DSN access information includes one or more of the DSN addressing information, a DSN access credential, and the user ID.

The software memory 118 includes memory to store one or more of DS processing software, boot software, operating system (OS) software, application software, protocol conversion software, network access software, server access software, wireless network access software, and interface driver software. The wireless transceiver 120 includes a wireless transmitter and receiver pair and converts information into wireless signals 124 and converts the wireless signals 124 into information. The wireless transceiver 120 communicates the wireless signals 124 with the wireless network 108 and may operate in accordance with one or more wireless industry standards including universal mobile telecommunications system (UMTS), global system for mobile communications (GSM), long term evolution (LTE), wideband code division multiplexing (WCDMA), IEEE 802.11, IEEE 802.16, WiMax, Bluetooth, or any other LAN, WAN, PAN or like wireless protocol.

The DSN access server 104 provides storage for one or more of DS processing software, an access control list (ACL), and access credentials. The content server 106 provides storage for one or more of digital music content, digital book content, digital video content, and any other type of multimedia content.

In an implementation embodiment, the DSN access token module 102 resembles an external memory device (e.g., a FLASH drive), wherein the interface 30 operates in accordance with an industry universal serial bus protocol (USB) standard. For example, the DSN access token module 102 is coupled to the user device 14 such that DSN information 122 may be transferred back and forth between the user device 14 and the DSN access token module 102 utilizing interface 30 of the DSN access token 102 and interface 30 of the user device 14. The DSN information 122 may be utilized to facilitate access to the DSN memory 22 and/or the content server 106 by the user device 14. For example, the user device 14 acquires secure token information as the DSN information 122 from the DSN access token module 102 and utilizes the secure token information to access the DSN memory 22.

As another example, the user device 14 acquires the secure token information from the DSN access token module 102, acquires DS processing software from the DSN access token module 102, dispersed storage error encodes data to produce encoded data slices for storage utilizing the DS processing software, and utilizes the secure token information to store the encoded data slices in the DSN memory 22. As yet another example, the user device 14 sends data for storage to the DSN access token module 102 and the DSN access token module 102 dispersed storage error encodes the data to produce a plurality of sets of encoded data slices. Next, the DSN access token module 102 sends DSN access information 122 (e.g., a DSN address, an access credential) and the plurality of sets of encoded data slices to the user device 14. The user device 14 sends the plurality of sets of encoded data slices to the DSN memory 22 utilizing the DSN access information 122 for storage therein. The method of operation is discussed in greater detail with reference to FIGS. 7-14.

Alternatively, the DSN access token module 102 is implemented as a software module. For example, the DSN access token module 102 is implemented in the user device 14. As another example, the DSN access token module 102 is implemented in the DSN access server 104.

Figure 7:
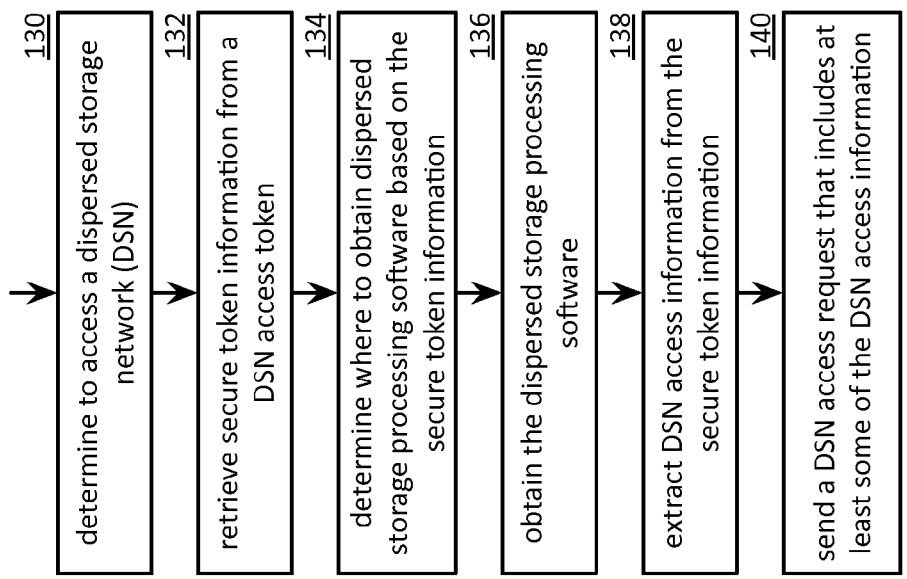
FIG. 7 is a flowchart illustrating an example of accessing a dispersed storage network (DSN) in accordance with the invention.

FIG. 7 is a flowchart illustrating an example of accessing a dispersed storage network (DSN). The method begins with step 130 where a processing module (e.g., of a user device) determines to access a dispersed storage network (DSN). The determination may be based on one or more of a retrieval request, a storage request, a message, a storage capacity requirement exceeding a local storage threshold, and detection/pairing of a DSN access token module. The processing module may retrieve boot software from the DSN access token module to enable execution of at least some of the following steps.

The method continues at step 132 where the processing module retrieves secure token information from the DSN access token module. The processing module may retrieve the secure token information by one or more of retrieving the secure token information utilizing a secure token module address and sending a secure token information request message to the DSN access token module. The method continues at step 134 where the processing module determines where to obtain dispersed storage (DS) processing software based on the secure token information. The determination may be based on one or more of extracting the location from the secure token information, extracting a location of the location from the secure token information, and a user device query to determine whether the DS processing software is stored in a memory of an associated user device. The location may indicate one or more of a DSN access server identifier (ID) and/or address, and a DS software memory address within the DSN access token module, a user device ID. For example, the processing module determines a location to obtain the DS processing software as an address within the DS software memory of the DSN access token module based on extracting the location from the secure token information.

The method continues at step 136 where the processing module obtains the DS processing software based on the location. For example, the processing module retrieves the DS processing software from the DS software memory of the DSN access token module. As another example, the processing module sends a DS processing software request message to a processing module of the DSN access token module. The processing module of the DSN access token module retrieves the DS processing software from the DS software memory and sends the DS processing software to the processing module (e.g., of the user device). As yet another example, the processing module sends a DS processing software request message to a DSN access server. The DSN access server retrieves the DS processing software from a memory of the DSN access server and sends the DS processing software to the processing module (e.g., of the user device). As a further example, the processing module sends a DS processing software request message to another user device. The another user device retrieves the DS processing software from a memory of the another user device and sends the DS processing software to the processing module (e.g., of the user device). The processing module may obtain the DS processing software from a second location when a retrieval attempt from a first a location fails.

The method continues at step 138 where the processing module extracts DSN access information from the secure token information. The extraction may include determining which component of the secure token information comprises the DSN access information to produce identify components and obtaining one or more of the identified components. The determining may be based on one or more of a DSN access procedure, a DSN ID, a message, a predetermination, and a query. The method continues at step 140 where the processing module sends a DSN access request that includes at least some of the DSN access information. The processing module may append a user password (e.g., input from a user of a user device, stored in a local memory associated with the processing module of user device) and or a hash of the user password to the access request. The DSN access request includes at least one of a read request, a read-if-modified request, a write request, a check write request, a modify request, a replacement request, a delete request, a list request, and a commit transaction request. For example, the processing module sends the DSN access request which includes a write request to a DSN address of the DSN access information, wherein the DSN access request includes an access credential and a hash of a user password.

Figure 8A:
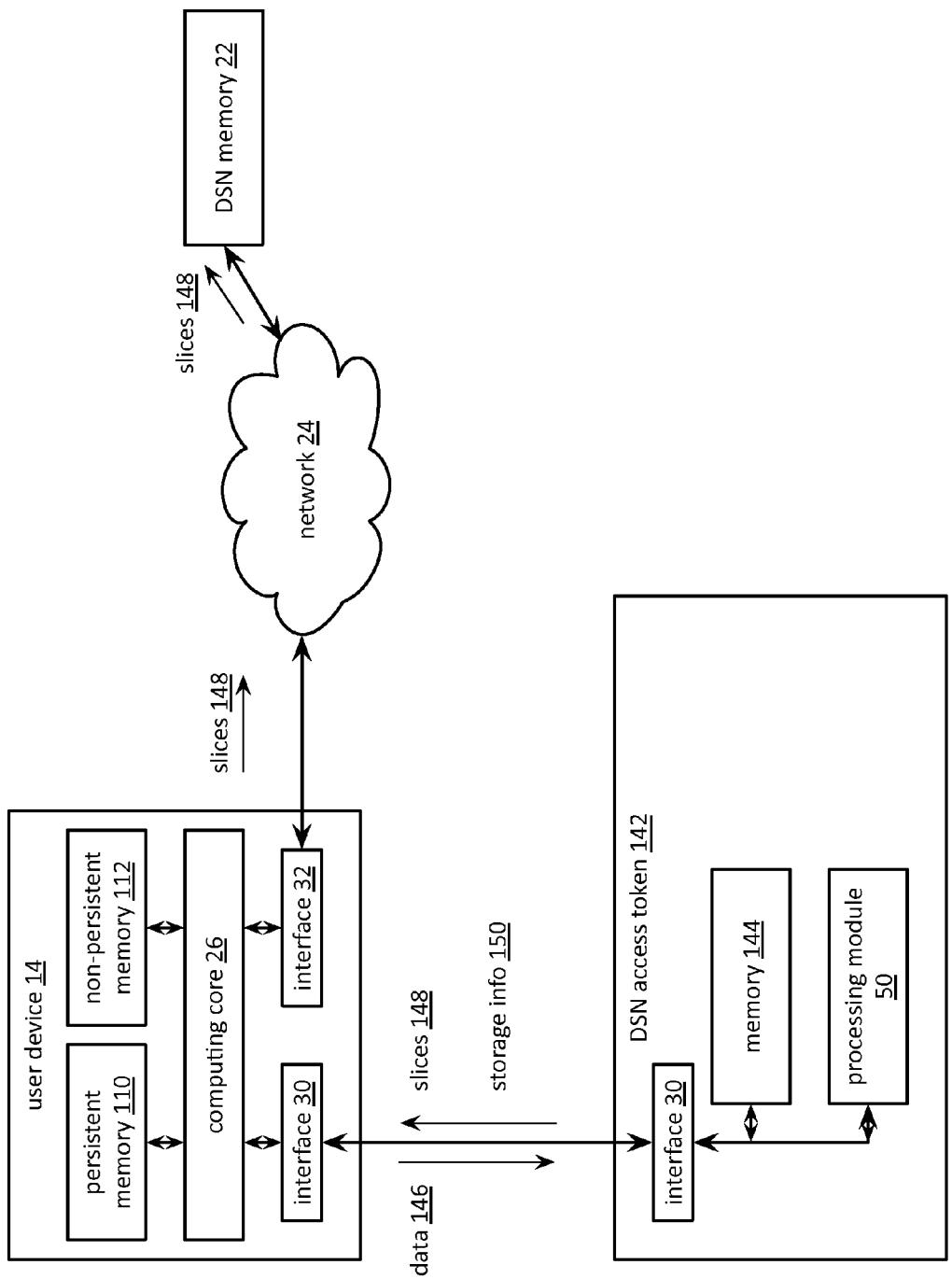
FIG. 8A is a schematic block diagram of another embodiment of a computing system in accordance with the invention.

FIG. 8A is a schematic block diagram of another embodiment of a computing system that includes a user device 14, a network 24, a dispersed storage network (DSN) memory 22, and a DSN access token module 142. The DSN access token module 142 includes an interface module 30 for interfacing with the computing device 14, a memory 144, and a processing module 50 operably coupled to the memory 144. The interface module 30 includes at least one of a universal serial bus (USB) interface module, a Bluetooth interface module, a fire-wire interface module, a 60 GHz wireless transceiver, and a Wi-Fi interface module.

The processing module 50 is operable to manage a pairing between the DSN access token module 142 and the computing device 14. The managing the pairing includes determining whether the DSN access token module 142 is actively paired to the computing device 14 and when the DSN access token module 142 is not actively paired to the computing device 14, facilitating pairing of the DSN access token module 142 to the computing device 14. The managing the pairing further includes authenticating one or more of a vault identifier (ID) of the DSN memory associated with the computing device, an object number associated with the computing device, an access credential of the computing device, a key of the computing device, a user device ID associated with the computing device, and a password associated with the computing device.

When the computing device 14 is paired with the DSN access token module 142, the processing module 50 is further operable to receive, from the computing device 14 via the interface module 30, at least a portion of data 146 to be stored in DSN memory 22; encode the at least a portion of the data 146 using a dispersed storage error encoding function to produce one or more sets of encoded data slices 148; and send, via the interface module 30, the one or more sets of encoded data slices 148 and storage information 150 to the computing device 14, wherein the storage information 150, when processed by the computing device 14, causes the computing device to send the one or more sets of encoded data slices 148 in accordance with the storage information 150 to the DSN memory 22 for storage therein.

The receiving the at least a portion of the data 146 further includes sending a data segmenting command to the computing device 14 that, when executed by the computing device 14, causes the computing device 14 to segment the data in accordance with the data segmenting command to produce data segments and receiving, from the computing device 14, one of the data segments as the at least a portion of the data 146. The storage information 150 includes a set of write requests for a set of the one or more sets of encoded data slices 148, wherein a write request of the set of write requests includes a slice name for a corresponding one of the encoded data slices 148 of the set and DSN addressing information for the corresponding one of the encoded data slices 148.

Figure 8B:
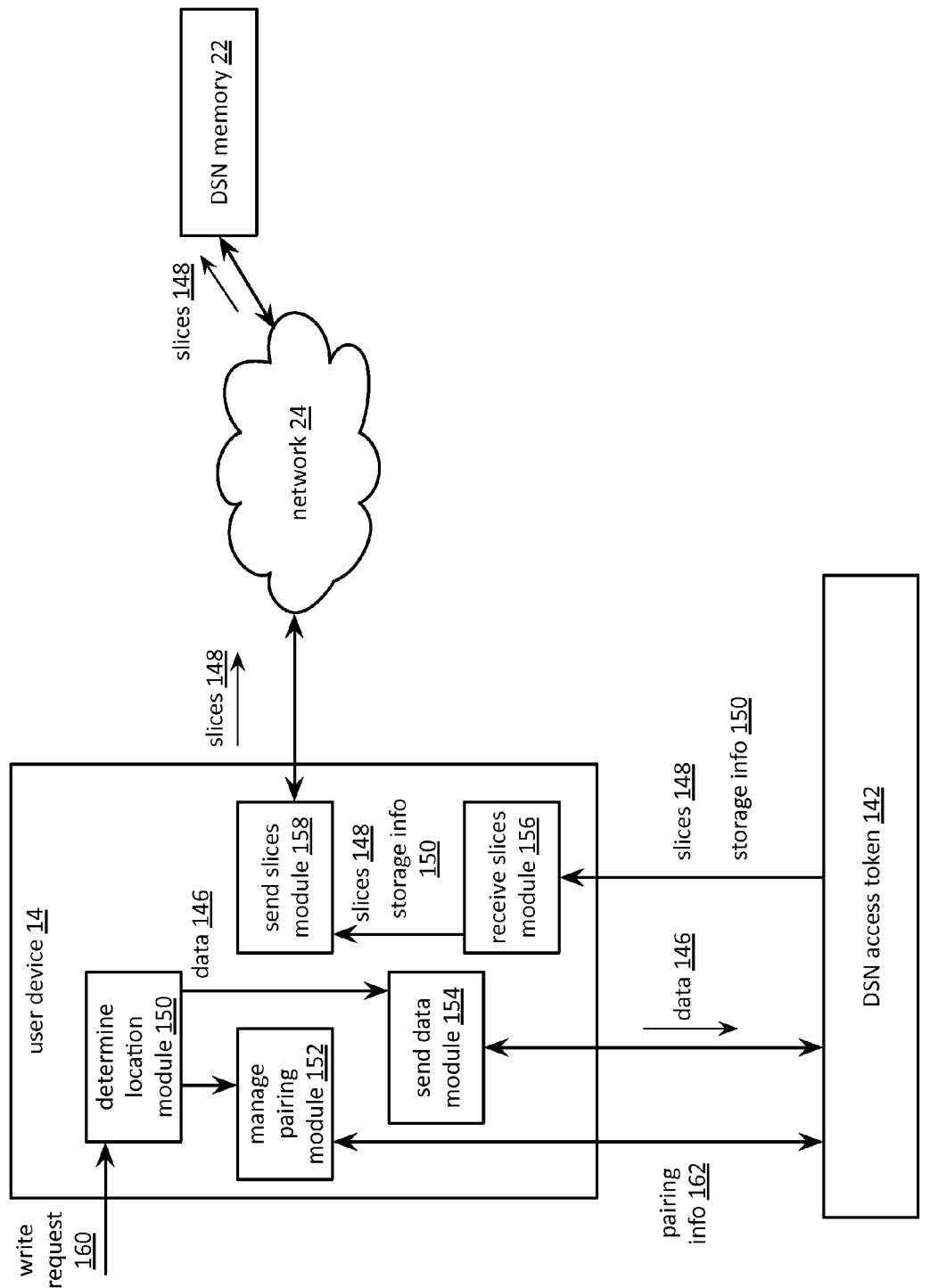
FIG. 8B is a schematic block diagram of another embodiment of a computing system in accordance with the invention.

FIG. 8B is a schematic block diagram of another embodiment of a computing system that includes a user device 14, a network 24, a dispersed storage network (DSN) memory 22, and a DSN access token module 142. The user device 14 includes a module for facilitating storage of data 146 in a dispersed storage network (DSN) memory 22. The module includes a determine location module 150, a manage pairing module 152, a send data module 154, a receive slices module 156, and a send slices module 158. The determine location module 150 is operable to determine where to store the data 146. The determine location module 150 is further operable to determine where to store the data 146 by at least one of interpreting a write request 160 regarding the data 146, wherein the write request 160 indicates storing the data 146 in the DSN memory 22, receiving a response to a graphical user interface prompt regarding storage location of the data 146, and when the computing device 14 is paired with the DSN access token module 142, indicating storage in the DSN memory 22.

The manage pairing module 152 is operable to participate in managing a pairing between the DSN access token module 142 and the computing device 14 when the data 146 is to be stored in the DSN memory 22. The participating in the managing of the pairing comprises providing, for authentication by the DSN access token module 142, pairing information 162 including at least one of a vault identifier (ID) of the DSN memory 22 associated with the computing device 14, an object number associated with the computing device 14, an access credential of the computing device 14, a key of the computing device 14, a user device ID associated with the computing device 14, and a password associated with the computing device 14.

The send data module 154 is operable to send at least a portion of the data 146 to the DSN access token module 142 when the computing device 142 is paired with the DSN access token module 142, wherein the DSN access token module 142 encodes the at least a portion of the data 146 using a dispersed storage error encoding function to produce one or more sets of encoded data slices 148. The send data module 154 is further operable to receive, from the DSN access token module 142, a data segmenting command to the computing device 14; segment the data 146 in accordance with the data segmenting command to produce data segments; and send one of the data segments as the at least a portion of the data 146.

The receive slices module 156 is operable to receive, from the DSN access token module 142, the one or more sets of encoded data slices 148 and storage information 150 to the computing device. The storage information 150 includes a set of write requests for a set of the one or more sets of encoded data slices 148, wherein a write request of the set of write requests includes a slice name for a corresponding one of the encoded data slices of the set and DSN addressing information for the corresponding one of the encoded data slices 148. The send slices module 158 is operable to send the one or more sets of encoded data slices 148 in accordance with the storage information 150 to the DSN memory 22 for storage therein.

Figure 8C:
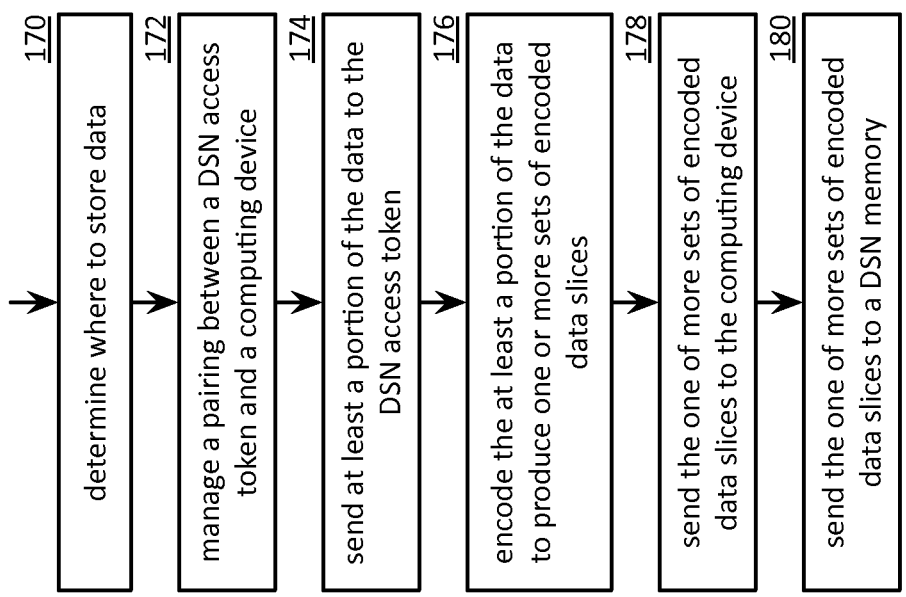
FIG. 8C is a flowchart illustrating an example of storing data in a dispersed storage network (DSN) in accordance with the invention.

FIG. 8C is a flowchart illustrating an example of storing data in a dispersed storage network (DSN). The method begins with step 170 where a computing device (e.g., a user device) determines where to store the data. The determining where to store the data further includes at least one of interpreting a write request regarding the data, wherein the write request indicates storing the data in the DSN memory, receiving a response to a graphical user interface prompt regarding storage location of the data, and indicating storage in the DSN memory when the computing device is paired with the DSN access token module. The write request may further include one or more of the data, a data type indicator, a data size indicator, a data identifier (ID), a filename, a vault ID, an object number associated with the data, and a file ID.

The method continues at step 172 where a DSN access token module manages a pairing between the DSN access token module and the computing device when the data is to be stored in dispersed storage network (DSN) memory. The managing the pairing includes authenticating one or more of a vault identifier (ID) of the DSN memory associated with the computing device, an object number associated with the computing device, an access credential of the computing device, a key of the computing device, a user device ID associated with the computing device, and a password associated with the computing device. The managing the pairing further includes determining whether the DSN access token module is actively paired to the computing device and facilitating pairing of the DSN access token module to the computing device when the DSN access token module is not actively paired to the computing device.

The method continues at step 174 where the computing device sends at least a portion of the data to the DSN access token module when the computing device is paired with the DSN access token module. The computing device sending the at least a portion of the data to the DSN access token module further includes sending, by the DSN access token module, a data segmenting command to the computing device; segmenting, by the computing device, the data in accordance with the data segmenting command to produce data segments; and sending, by the computing device, one of the data segments as the at least a portion of the data. The segmenting may be in accordance with a segmentation approach and based on at least one of a predetermined segment size, a segment size retrieved from the DSN access token module, a segment size retrieved from a memory associated with the computing device, and a segment size based on the data size indicator. For example, the computing device extracts the data segment size from secure token information retrieved from the DSN access token and segments the data in accordance with the data segment size to produce a plurality of data segments.

The method continues at step 176 where the DSN access token module encodes the at least a portion of the data using a dispersed storage error encoding function in accordance with dispersed storage error coding parameters (e.g., obtained from a memory of the DSN access token module) to produce one or more sets of encoded data slices. The method continues at step 178 where the DSN access token module sends the one or more sets of encoded data slices and storage information to the computing device. The storage information includes a set of write requests for a set of the one or more sets of encoded data slices, wherein a write request of the set of write requests includes a slice name for a corresponding one of the encoded data slices of the set and DSN addressing information for the corresponding one of the encoded data slices. The method continues at step 181 where the computing device sends the one or more sets of encoded data slices in accordance with the storage information to the DSN memory for storage therein.

Figure 9A:
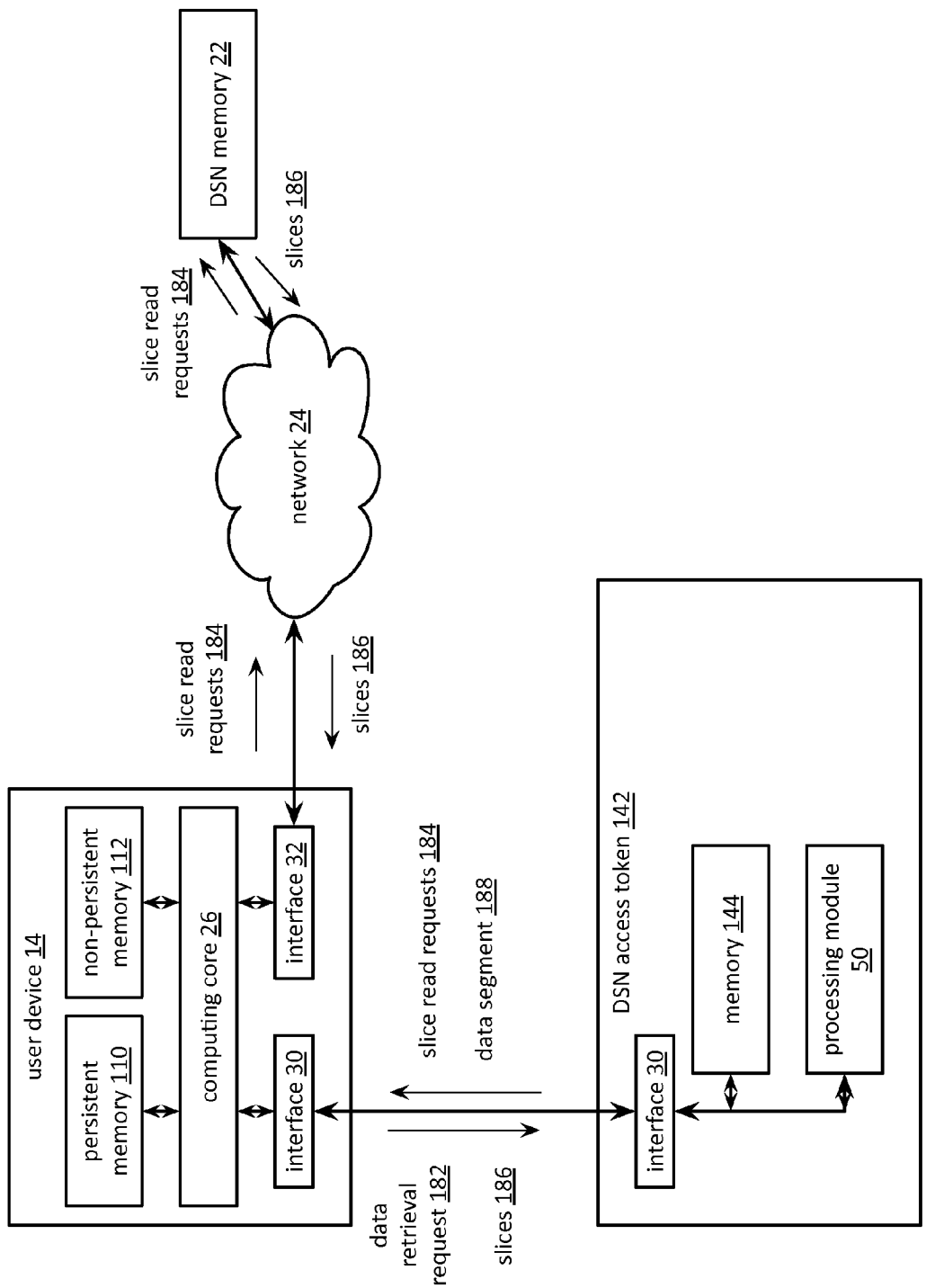
FIG. 9A is a schematic block diagram of another embodiment of a computing system in accordance with the invention.

FIG. 9A is a schematic block diagram of another embodiment of a computing system that includes a user device 14 (e.g., a computing device), a network 24, a dispersed storage network (DSN) memory 22, and a DSN access token module 142. The DSN access token module 142 includes an interface module 30 for interfacing with the computing device 14, a memory 144, and a processing module 50 operably coupled to the memory 144. The interface module 30 includes at least one of a universal serial bus (USB) interface module, a Bluetooth interface module, a fire-wire interface module, a 60 GHz wireless transceiver, and a Wi-Fi interface module.

The processing module 50 is operable to manage a pairing between the DSN access token module 142 and the computing device 14. The managing the pairing includes determining whether the DSN access token module 142 is actively paired to the computing device 14 and when the DSN access token module 142 is not actively paired to the computing device 14, facilitating pairing of the DSN access token module 142 to the computing device 14. The managing the pairing further includes authenticating one or more of a vault identifier (ID) of the DSN memory associated with the computing device, an object number associated with the computing device, an access credential of the computing device, a key of the computing device, a user device ID associated with the computing device, and a password associated with the computing device.

When the DSN access token module 142 is paired with the computing device 14, the processing module 50 is operable to receive a data retrieval request 182 regarding the data from the computing device 14, generate a plurality of sets of at least a threshold number of data slice read requests 184 in response to the data retrieval request, and send the plurality of sets of the at least a threshold number of data slices read requests 184 to the computing device 14. The data retrieval request 182 may include one or more of a data identifier (ID), a file ID, a filename, a user ID, a vault ID, and a password. The generating the plurality of sets of the at least a threshold number of data slice read requests 184 further includes one or more of authenticating the data retrieval request 182; when the data retrieval request 182 is authenticated, determining, for the data, DSN data storage information, which includes one or more of vault identification (ID), user ID, slice names, and a list of dispersed storage (DS) units; and generating the plurality of sets of the at least a threshold number of data slice read requests 184 based on the DSN data storage information.

The processing module 50 is operable to, for a set of the plurality of sets of the at least a threshold number of data slices read requests, receive at least a threshold number of data slices 186 from the computing device 14, where the computing device 14 received the at least a threshold number of data slices 186 from the DSN memory 22 in response to the set of the at least a threshold number of data slices read requests 184, decode the at least a threshold number of data slices 186 in accordance with a dispersed storage error encoding function to produce a decoded data segment 188, and send the decoded data segment 188 to the computing device 14. The processing module 50 is further operable to send de-segmenting information to the computing device such that, when performed by the computing device, the computing device de-segments a plurality of data segments to produce the data, wherein the plurality of data segments includes the decoded data segment 188.

Figure 9B:
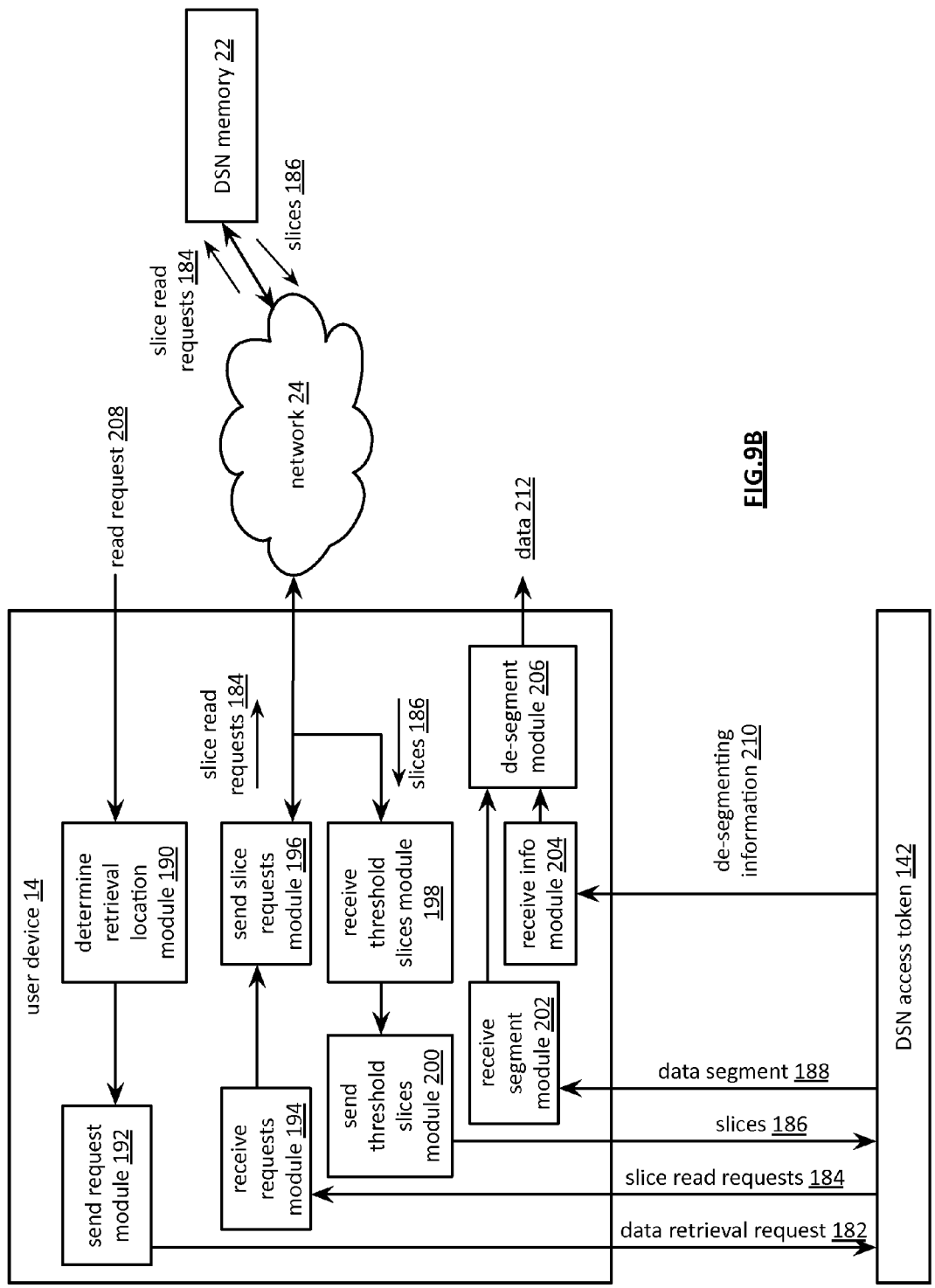
FIG. 9B is a schematic block diagram of another embodiment of a computing system in accordance with the invention.

FIG. 9B is a schematic block diagram of another embodiment of a computing system that includes a user device 14, a network 24, a dispersed storage network (DSN) memory 22, and a DSN access token module 142. The user device 14 includes a module for facilitating retrieval of data 212 from a dispersed storage network (DSN) memory 22. The module includes a determine retrieval location module 190, a send request module 192, a receive requests module 194, a send slice requests module 196, a receive threshold slices module 198, a send threshold slices module 200, a receive segment module 202, a receive information module 204, and a de-segment module 206.

The determine retrieval location module 190 is operable to determine that the data 212 is stored in the DSN memory 22, wherein the data 212 is stored as a plurality of sets of encoded data slices in accordance with a dispersed storage error encoding function. The determine retrieval location module 190 is further operable to interpret a read request 208 regarding the data to determine that the data 212 is stored in the DSN memory 22, wherein the read request 208 indicates that the data 212 is stored in the DSN memory 22; receive a response to a graphical user interface prompt regarding retrieval of the data 212 to determine that the data 212 is stored in the DSN memory 22; and when the computing device 14 is paired with the DSN access token module 142, indicating that the data 212 is stored in the DSN memory 22.

The send request module 192 is operable to send a data retrieval request 182 to the DSN access token module 142 regarding the data 212 when the computing device 14 that includes the module is paired with the DSN access token module 142. The receive requests module 194 is operable to receive a plurality of sets of at least a threshold number of data slices read requests 184 from the DSN access token module 142, wherein the DSN access token module 142 generated the plurality of sets of at least a threshold number of data slice read requests 184 in response to the data retrieval request 182.

The send slice requests module 196 is operable, for a set of the plurality of sets of the at least a threshold number of data slices read requests 184, to send the set of the at least a threshold number of data slices read requests 184 to the DSN memory 22. The receive threshold slices module 198 is operable to receive at least a threshold number of data slices 186 from the DSN memory 22. The send threshold slices module 200 is operable to send the at least a threshold number of data slices 186 to the DSN access token module 142.

The receive segment module 202 is operable to receive a decoded data segment 188 from the DSN access token module 142, wherein the DSN access token module 142 decoded the at least a threshold number of data slices 186 in accordance with the dispersed storage error encoding function to produce the decoded data segment 188. The receive information module 204 is operable to receive de-segmenting information 210 from the DSN access token module 142. The de-segmenting information 210 includes one or more of a data segment size indicator, a data segmentation approach, and a number of data segments. The de-segment module 206 is operable to de-segment a plurality of data segments in accordance with the de-segmenting information 210 to reproduce the data 212, wherein the plurality of data segments includes the decoded data segment 188.

Figure 9C:
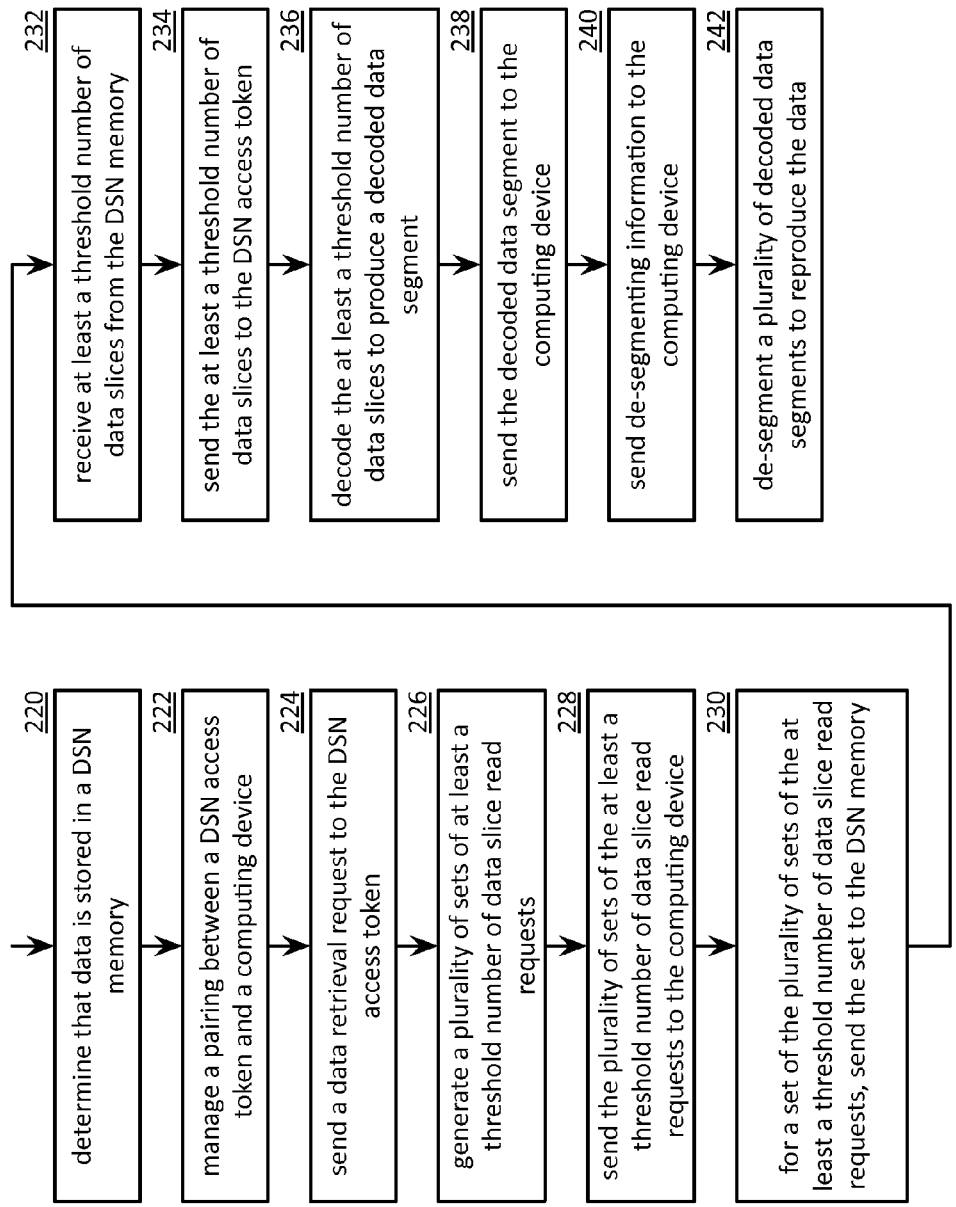
FIG. 9C is a flowchart illustrating an example of retrieving data from a dispersed storage network (DSN) in accordance with the invention.

FIG. 9C is a flowchart illustrating an example of retrieving data from a dispersed storage network (DSN). The method begins at step 220 where a computing device (e.g., a user device) determines that the data is stored in dispersed storage network (DSN) memory, wherein the data is stored as a plurality of sets of encoded data slices in accordance with a dispersed storage error encoding function. The determining that the data is stored in the DSN memory includes one or more of interpreting a read request regarding the data, wherein the read request indicates that the data is stored in the DSN memory, receiving a response to a graphical user interface prompt regarding retrieval of the data, and when the computing device is paired with a DSN access token module, indicating that the data is stored in the DSN memory.

The method continues at step 222 where the DSN access token module manages the pairing between the DSN access token module and the computing device by authenticating one or more of a vault identifier (ID) of the DSN memory associated with the computing device, an object number associated with the computing device, an access credential of the computing device, a key of the computing device, a user device ID associated with the computing device, and a password associated with the computing device. The managing of the pairing between the DSN access token module and the computing device by further includes determining whether the DSN access token module is actively paired to the computing device and when the DSN access token module is not actively paired to the computing device, facilitating pairing of the DSN access token module to the computing device.

The method continues at step 224 where the computing device sends a data retrieval request to the DSN access token module regarding the data when the computing device is paired with a DSN access token module. The method continues at step 226 where the DSN access token module generates a plurality of sets of at least a threshold number of data slice read requests in response to the data retrieval request. The generating of the plurality of sets of the at least a threshold number of data slice read requests includes one or more of authenticating the data retrieval request; when the data retrieval request is authenticated, determining, for the data, DSN data storage information, which includes one or more of vault identification (ID), user ID, slice names, and a list of dispersed storage (DS) units; and generating the plurality of sets of the at least a threshold number of data slice read requests based on the DSN data storage information.

The method continues at step 228 where the DSN access token module sends the plurality of sets of the at least a threshold number of data slices read requests to the computing device. The method continues at step 230 for a set of the plurality of sets of the at least a threshold number of data slices read requests where the computing device sends the set of the at least a threshold number of data slices read requests to the DSN memory. The method continues at step 232 where the computing device receives at least a threshold number of data slices from the DSN memory. The method continues at step 234 where the computing device sends the at least a threshold number of data slices to the DSN access token module. The method continues at step 236 where the DSN access token module decodes the at least a threshold number of data slices in accordance with the dispersed storage error encoding function to produce a decoded data segment. The method continues at step 238 where the DSN access token module sends the decoded data segment to the computing device.

The method continues at step 240 where the DSN access token module sends de-segmenting information to the computing device. The method continues at step 242 where the computing device de-segments a plurality of data segments in accordance with the de-segmenting information to reproduce the data, wherein the plurality of data segments includes the decoded data segment.

FIG. 10A is a flowchart illustrating another example of accessing a dispersed storage network (DSN), which includes similar steps to FIG. 7. The method begins with step 132 of FIG. 7 where a processing module (e.g., of a user device) retrieves secure token information from a DSN access token module. The secure token information may include additional information including one or more of a DSN provider list, DSN storage plan information, DSN storage rates, a prepaid storage credit indicator, and a DSN storage alert (e.g., further payment required to continue to store data in a DSN network). The processing module may output at least some of the secure token information via a user interface (e.g., a user display) to prompt a user for DSN storage information input. The method continues at step 244 where the processing module receives DSN storage information input. For example, the processing module receives the DSN storage information input including a selected DSN provider, a selected DSN storage plan, and payment information. The method continues at step 246 where the processing module sends the DSN storage information to the DSN access token module.

The method continues at step 248 where the processing module receives DSN access information. The DSN access information may be based on the DSN storage information. For example, the processing module receives the DSN access information including a DSN address associated with a selected DSN provider. The method continues at step 250 where the processing module accesses a DSN memory in accordance with the DSN access information (e.g., utilizing the DSN address, a credential, the user ID, and a password). The accessing may include at least one of reading slices, writing slices, deleting slices, listing slices, modifying slices, and replacing slices.

The method continues at step 252 where the processing module determines DSN storage statistics. The DSN storage statistics includes one or more of an amount of data stored, time duration of data stored, a payment cost indicator, a current payment balance, a payment required indicator, a data access availability indicator, and a data storage reliability indicator. The determination may be based on one or more of retrieving a storage history record, a DSN query, and a message. The method continues at step 254 where the processing module sends the DSN storage statistics to the DSN access token module.

FIG. 10B is a flowchart illustrating an example of determining dispersed storage network (DSN). The method begins with step 256 where a processing module (e.g., of a dispersed storage network (DSN) access token) receives a secure token information request (e.g., from a user device). For example, the secure token information request includes DSN storage statistics. The method continues at step 258 where the processing module retrieves secure token information (e.g., from a secure token module, from a local memory). The method continues at step 260 where the processing module sends the secure token information to the user device. The sending a secure token information may include generating an alert and sending the alert as part of the secure token information. For example, the processing module includes a DSN storage alert in the secure token information when the processing module determines that insufficient payment has been received for DSN storage services.

The method continues at step 262 where the processing module receives DSN storage information (e.g., from a user device). The DSN storage information may include user selections. The method continues at step 264 where the processing module determines DSN access information based on the DSN storage information. For example, the processing module retrieves one or more of a DSN address, DSN access credentials, an access credential, and an encryption key based on a memory lookup corresponding to a DSN provider selection of the DSN storage information. The method continues at step 266 where the processing module sends the DSN access information to the user device.

Figure 11A:
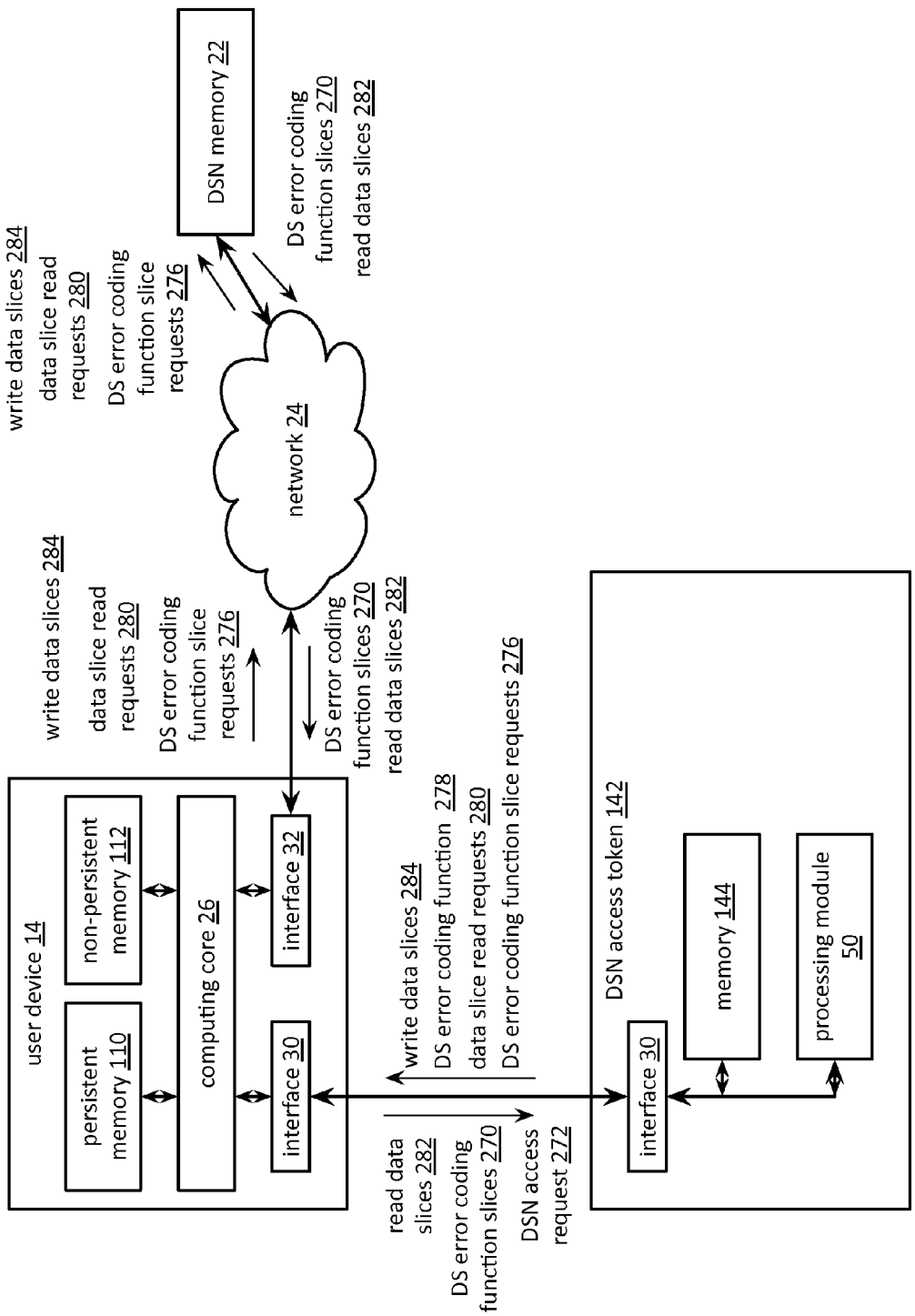
FIG. 11A is a schematic block diagram of another embodiment of a computing system in accordance with the invention.

FIG. 11A is a schematic block diagram of another embodiment of a computing system that includes a user device 14 (e.g., a computing device), a network 24, a dispersed storage network (DSN) memory 22, and a DSN access token module 142. The DSN access token module 142 includes an interface module 30 for interfacing with the computing device 14, a memory 144, and a processing module 50 operably coupled to the memory 144. The interface module 30 includes at least one of a universal serial bus (USB) interface module, a Bluetooth interface module, a fire-wire interface module, a 60 GHz wireless transceiver, and a Wi-Fi interface module.

When the DSN access token module 142 is paired with a computing device 14, the processing module is operable to retrieve a plurality of sets of at least a threshold number of dispersed storage (DS) error coding function slices 270 from the DSN memory 22 via the computing device 14, determine decoding responsibilities based on DS processing features of the computing device 14, decode, in accordance with the decoding responsibilities, at least some of the plurality of sets of the at least a threshold number of DS error coding function slices 270 using a default DS error coding function to recapture at least a portion of a DS error coding function 278, determine executing responsibilities based on the DS processing features of the computing device 14, and execute, in accordance with the executing responsibilities, at least a portion of the DS error coding function 278 to access the DSN memory 22 regarding the data.

The DS processing features of the computing device 14 includes one or more of a storage capacity indicator, a central processing unit (CPU) speed capability indicator, an average CPU loading indicator, a software element identifier (ID), software version information, an interface type indicator, a number of interfaces indicator, a memory capacity indicator, a memory loading indicator, a memory type indicator, a operational status indicator, a performance indicator, and a hardware list. For example, the processing module 50 determines the decoding responsibilities to include the DSN access token module 142 to perform all decoding when the average CPU loading indicator of the computing device 14 indicates that the loading is above a high loading threshold. As another example, the processing module 50 determines the executing responsibilities to include the computing device 14 to perform all of the DS error coding function 278 when the performance indicator indicates that a performance level associated with the computing device 14 is above a computing level threshold.

The retrieving the plurality of sets of the at least a threshold number of DS error coding function slices 270 further includes receiving, from the computing device, a DSN access request 272 regarding data 274 to the DSN access token module 142, determining the DS error coding function 278 in response to the DSN access request 272, determining DSN storage information for the DS error coding function, generating a plurality of sets of at least a threshold number of DS error coding function slice read requests 276 based on the DSN storage information, sending the plurality of sets of the at least a threshold number of DS error coding function slices read requests 276 to DSN memory 22 via the computing device 14, receiving the plurality of sets of the at least a threshold number of DS error coding function slices 270 from the DSN memory 22 via the computing device 14.

The processing module 50 is further operable to store the DS error coding function 278 in memory 144 of the DSN access token module 142 and facilitate the computing device 14 to access the memory 144 to retrieve at least a portion of the DS error coding function 278 such that the computing device 14 executes, in accordance with the executing responsibilities, a remaining portion the DS error coding function 278 to access the DSN memory 22 regarding the data 274. The processing module 50 is further operable to delete the DSN error coding function 278 from the memory 144 of the DSN access token module 142 when execution of the DSN error coding function 278 to access the DSN memory 22 regarding the data 274 is complete.

The processing module 50 is further operable to determine that the accessing of the DSN 22 is regarding a data retrieval request (e.g., of the DSN access request 272) and wherein the executing the at least a portion of the DS error coding function 278 to access the DSN memory 22 regarding the data 274 includes generating a plurality of sets of at least a threshold number of data slice read requests 280 in response to the data retrieval request and for a set of the plurality of sets of the at least a threshold number of data slices read requests 280 sending the set of the at least a threshold number of data slices read requests 280 to the DSN memory 22 via the computing device 22, receiving at least a threshold number of data slices 282 (e.g., read data slices) from the DSN memory 22 via the computing device, and decoding the at least a threshold number of data slices 282 in accordance with the DS error coding function 278 to produce a decoded data segment.

The processing module 50 is further operable to determine that the accessing of the DSN 22 is regarding a data write request (e.g., detecting a write request of the DSN access request 272) and wherein the executing the at least a portion of the DS error coding function 278 to access the DSN memory 22 regarding the data 274 includes encoding at least a portion of the data 274 using the DS error coding function 278 to produce one or more sets of encoded data slices 284 (e.g., write data slices), generating storage information regarding the one or more sets of encoded data slices 284, and sending the one or more sets of encoded data slices 284 in accordance with the storage information (e.g., a DSN address) to the DSN memory 22 via the computing device 14.

The processing module 50 is further operable to manage the pairing between the DSN access token module 142 and the computing device 14 by at least one of authenticating one or more of a vault identifier (ID) of the DSN memory 22 associated with the computing device 14, an object number associated with the computing device 14, an access credential of the computing device 14, a key of the computing device 14, a user device ID associated with the computing device 14, and a password associated with the computing device 14; and determining whether the DSN access token module 142 is actively paired to the computing device 14 and, when the DSN access token module 142 is not actively paired to the computing device 14, facilitating pairing of the DSN access token module 142 to the computing device 14.

Figure 11B:
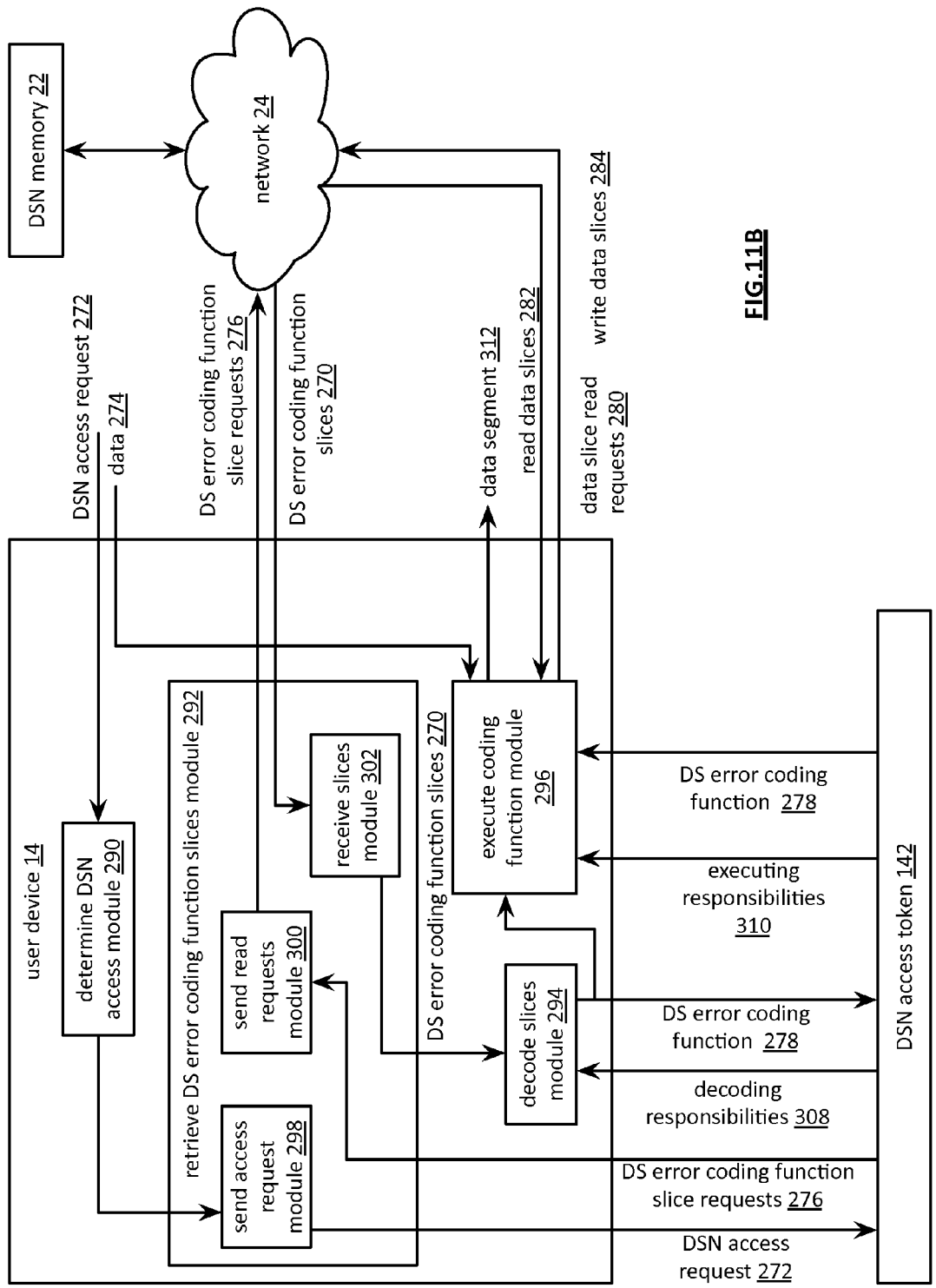
FIG. 11B is a schematic block diagram of another embodiment of a computing system in accordance with the invention.

FIG. 11B is a schematic block diagram of another embodiment of a computing system that includes a user device 14 (e.g., a computing device), a network 24, a dispersed storage network (DSN) memory 22, and a DSN access token module 142. The computing device 14 includes a module for facilitating accessing the DSN memory 22 regarding data 274. The module includes a determine DSN access module 290, a retrieve dispersed storage (DS) error coding function slices module 292, a decode slices module 294, and an execute coding function module 296. The determine DSN access module 290 is operable to determine that the DSN memory 22 is to be accessed regarding the data 274. For example, the DSN access module 290 determines that the DSN memory 22 is to be accessed when a DSN access request 272 is received indicating accessing the DSN memory 22 with regards to the data 274.

When the computing device 14 is paired with the DSN access token module 142, the retrieve DS error coding function slices module 292 is operable to retrieve, in response to a request (e.g., DS error coding function slices read requests 276) from the DSN access token module 142, a plurality of sets of at least a threshold number of DS error coding function slices 270 from the DSN memory 22. The retrieve DS error coding function slices module 292 includes a send access request module 298, a send read module 300, and a receive slices module 302.

The send access request module 298 is operable to send the DSN access request 272 regarding the data 274 to the DSN access token module 142. The send read requests module 300 is operable to send a plurality of sets of the at least a threshold number of DS error coding function slices read requests 276 to the DSN memory 22 via the computing device 14, wherein the DSN access token module 142 determines the DS error coding function 278 in response to the DSN access request 272 (e.g., a based on one or more of a lookup, a computing device identifier, and an identifier of the data 274), determines DSN storage information for the DS error coding function 278 (e.g., a DSN address corresponding to storage of the DS error coding function 278), and generates the plurality of sets of at least a threshold number of DS error coding function slice read requests 276 based on the DSN storage information (e.g., the requests include the DSN address corresponding to the storage of the DS error coding function 278). The receive slices module 302 is operable to receive the plurality of sets of the at least a threshold number of DS error coding function slices 270 from the DSN memory 22.

The decode slices module 294 is operable to decode, in accordance with decoding responsibilities 308 received from the DSN access token module, at least a portion of the plurality of sets of the at least a threshold number of DS error coding function slices 270 using a default DS error coding function to recapture at least a portion of a DS error coding function 278. The execute coding function module 296 is operable to execute, in accordance with executing responsibilities 310 received from the DSN access token module 142, at least a portion of the DS error coding function 278 to access the DSN memory 22 regarding the data 274.

The execute coding function module 296 is further operable to access the DS error coding function 278 from memory of the DSN access token module 142 for execution of the at least a portion of the DS error coding function 278 to access the DSN memory 22 regarding the data 274. The execute coding function module 296 is further operable to, when the accessing of the DSN 22 is regarding a data retrieval request, for a set of a plurality of sets of the at least a threshold number of data slices read requests 280, send the set of the at least a threshold number of data slices read requests 280 to the DSN memory 22; receive at least a threshold number of data slices 282 (e.g., read slices) from the DSN memory 22; and decode, in accordance with the executing responsibilities 310, the at least a threshold number of data slices 282 in accordance with the DS error coding function 278 to produce a decoded data segment 312.

The execute coding function module 296 is further operable to, when the accessing of the DSN 22 is regarding a data write request, to encode, in accordance with the executing responsibilities 310, at least a portion of the data 274 using the DS error coding function 278 to produce one or more sets of encoded data slices 284; generate, in accordance with the executing responsibilities 310, storage information regarding the one or more sets of encoded data slices 284; and send, in accordance with the executing responsibilities 310, the one or more sets of encoded data slices 284 in accordance with the storage information to the DSN memory 22 for storage therein.

Figure 11C:
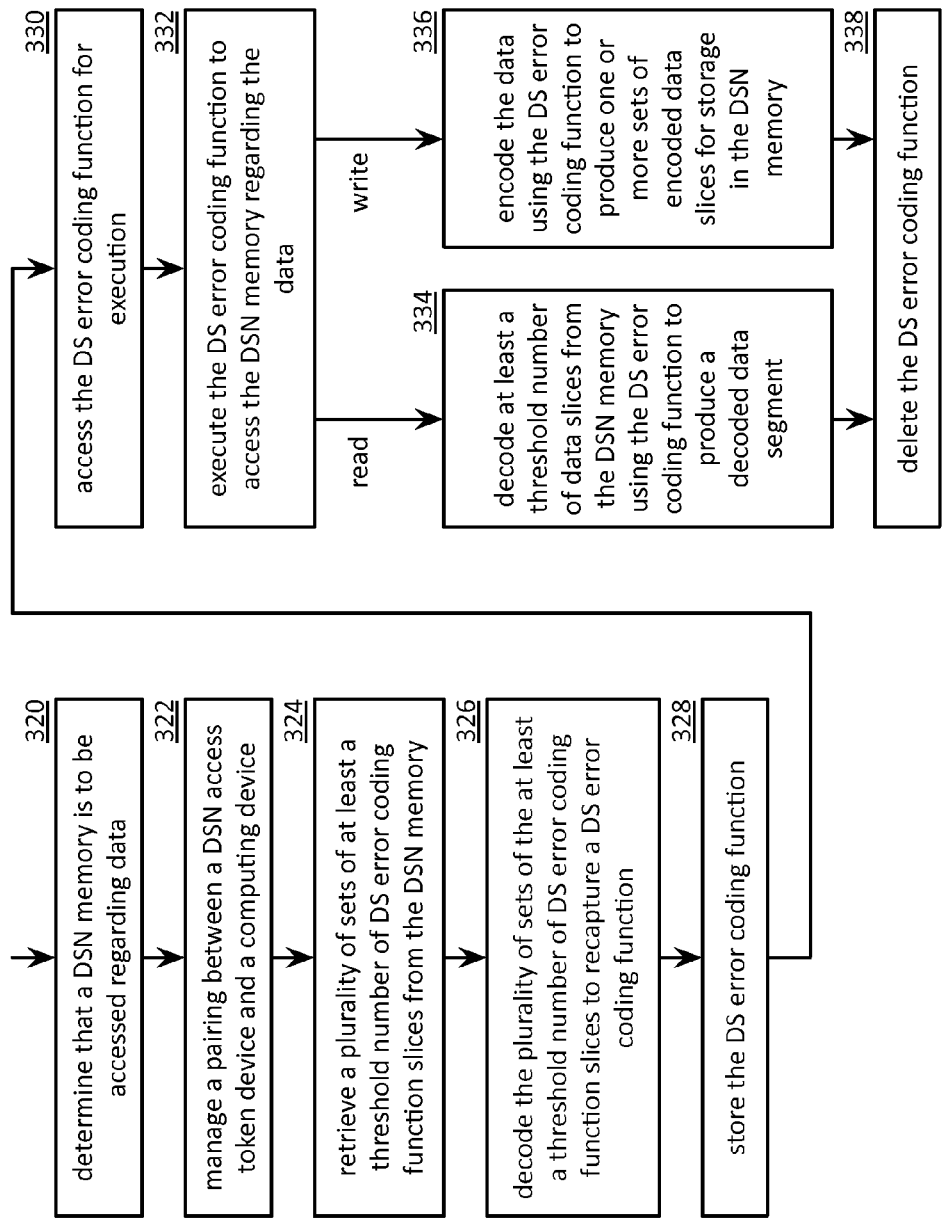
FIG. 11C is a flowchart illustrating another example of accessing a dispersed storage network (DSN) in accordance with the invention.

FIG. 11C is a flowchart illustrating an example of acquiring dispersed storage processing software. The method begins at step 320 where a computing device (e.g., a user device) determines that dispersed storage network (DSN) memory is to be accessed regarding data. The determining may include one of determining that the accessing of the DSN is regarding a data retrieval request and determining that the accessing of the DSN is regarding a data write request.

The method continues at step 322 where a DSN access token module manages a pairing between the DSN access token module and the computing device by at least one of authenticating one or more of a vault identifier (ID) of the DSN memory associated with the computing device, an object number associated with the computing device, an access credential of the computing device, a key of the computing device, a user device ID associated with the computing device, and a password associated with the computing device; determining whether the DSN access token module is actively paired to the computing device and, when the DSN access token module is not actively paired to the computing device, facilitating pairing of the DSN access token module to the computing device; and receiving DS processing feature information (e.g., a capability, a performance level, available software information, hardware configuration information) from the computing device, determining sharing of the decoding of the plurality of sets of the at least a threshold number of DS error coding function slices between the computing device and the DSN access token module based on the DS processing feature information, and determining sharing of the executing of the DS error coding function to access the DSN memory regarding the data between the computing device and the DSN access token module based on the DS processing feature information.

A method continues at step 324 where the DSN access token module retrieves a plurality of sets of at least a threshold number of dispersed storage (DS) error coding function slices from the DSN memory via the computing device when the computing device is paired with a DSN access token module. The retrieving the plurality of sets of the at least a threshold number of DS error coding function slices further includes sending, by the computing device, a DSN access request regarding the data to the DSN access token module; determining, by the DSN access token module, the DS error coding function in response to the DSN access request; determining, by the DSN access token module, DSN storage information for the DS error coding function; generating, by the DSN access token module, a plurality of sets of at least a threshold number of DS error coding function slice read requests based on the DSN storage information; sending, by the DSN access token module, the plurality of sets of the at least a threshold number of DS error coding function slices read requests to DSN memory via the computing device; and receiving, by the DSN access token module, the plurality of sets of the at least a threshold number of DS error coding function slices from the DSN memory via the computing device.

The method continues at step 326 where one or more of the computing device and the DSN access token module decodes the plurality of sets of the at least a threshold number of DS error coding function slices using a default DS error coding function (e.g., predetermined function, predetermined dispersal parameters) to recapture a DS error coding function. The method continues at step 328 where the DSN access token module stores the DS error coding function in memory of the DSN access token module.

The method continues at step 330 where the one or more of the computing device and the DSN access token module access the DS error coding function from the memory of the DSN access token module for execution. The method continues at step 332 where the one or more of the computing device and the DSN access token module executes the DS error coding function to access the DSN memory regarding the data.

The method continues at step 334 when the accessing of the DSN is regarding a data retrieval request, the executing the DS error coding function to access the DSN memory regarding the data includes generating a plurality of sets of at least a threshold number of data slice read requests in response to the data retrieval request and for a set of the plurality of sets of the at least a threshold number of data slices read requests sending, by the computing device, the set of the at least a threshold number of data slices read requests to the DSN memory, receiving, by the computing device, at least a threshold number of data slices from the DSN memory, and decoding the at least a threshold number of data slices in accordance with the DS error coding function to produce a decoded data segment.

The method continues at step 336 when the accessing of the DSN is regarding a data write request, the executing the DS error coding function to access the DSN memory regarding the data includes encoding at least a portion of the data using the DS error coding function to produce one or more sets of encoded data slices, generating storage information regarding the one or more sets of encoded data slices, and sending, by the computing device, the one or more sets of encoded data slices in accordance with the storage information to the DSN memory for storage therein. The method continues at step 338 when execution of the DSN error coding function to access the DSN memory regarding the data is complete, deleting, by the DSN access token module, the DSN error coding function from the memory of the DSN access token module.

Figure 12:
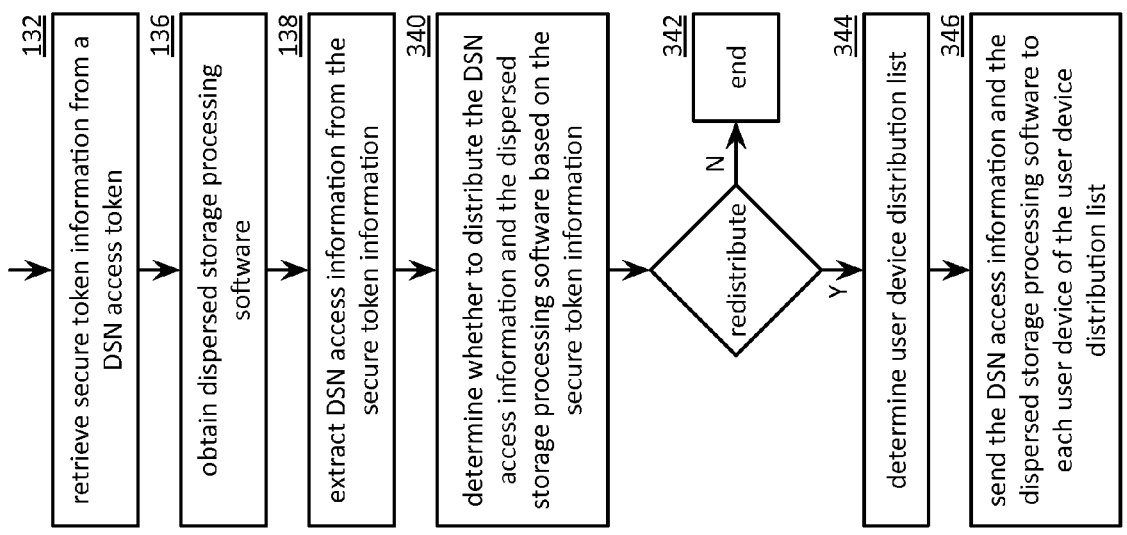
FIG. 12 is a flowchart illustrating an example of redistributing dispersed storage network (DSN) access information in accordance with the invention.

FIG. 12 is a flowchart illustrating an example of redistributing dispersed storage network (DSN) access information, which includes similar steps to FIG. 7. The method begins with steps 132, 136, and 138 of FIG. 7 where a processing module (e.g., of a user device) retrieves secure token information from a DSN access token module, obtains dispersed storage (DS) processing software, and extracts DSN access information from the secure token information. The retrieving the secure token information may include sending a secure token information request message to the DSN access token module prior to receiving the secure token information. The sending of the secure token information request message may be based on receiving a DSN access information request from at least one other user device.

The method continues at step 340 where the processing module determines whether to distribute the DSN access information and the DS processing software based on the secure token information. For example, the processing module extracts DSN access information redistribution permissions from the secure token information to determine whether redistribution is allowed. The method branches to step 344 when the processing module determines to redistribute. The method continues to step 342 when the processing module determines not to redistribute. The method ends at step 342.

The method continues at step 344 where the processing module determines the user device distribution list when the processing module determines to redistribute the DSN access information and the DS processing software. The determination may be based on one or more an allowed user device identifier (ID) list extracted from the secure token information, a disallowed user device ID list extracted from the secure token information, a redistribution maximum number of user devices, an actual redistribution number of user devices, and affiliated user device list, a predetermination, a query, and a message. For example, the processing module selects user device IDs from an affiliated user device list that includes user device IDs associated with user devices of a common affiliation (e.g., a family, friends, a coworker group, people in a common building, a neighborhood, a city, a county, a parish, a tribal territory, a state, province, a country, user devices of a similar status and/or location). The method continues at step 346 where the processing module sends the DSN access information and the DS processing software to each user device of the user device distribution list.

Figure 13A:
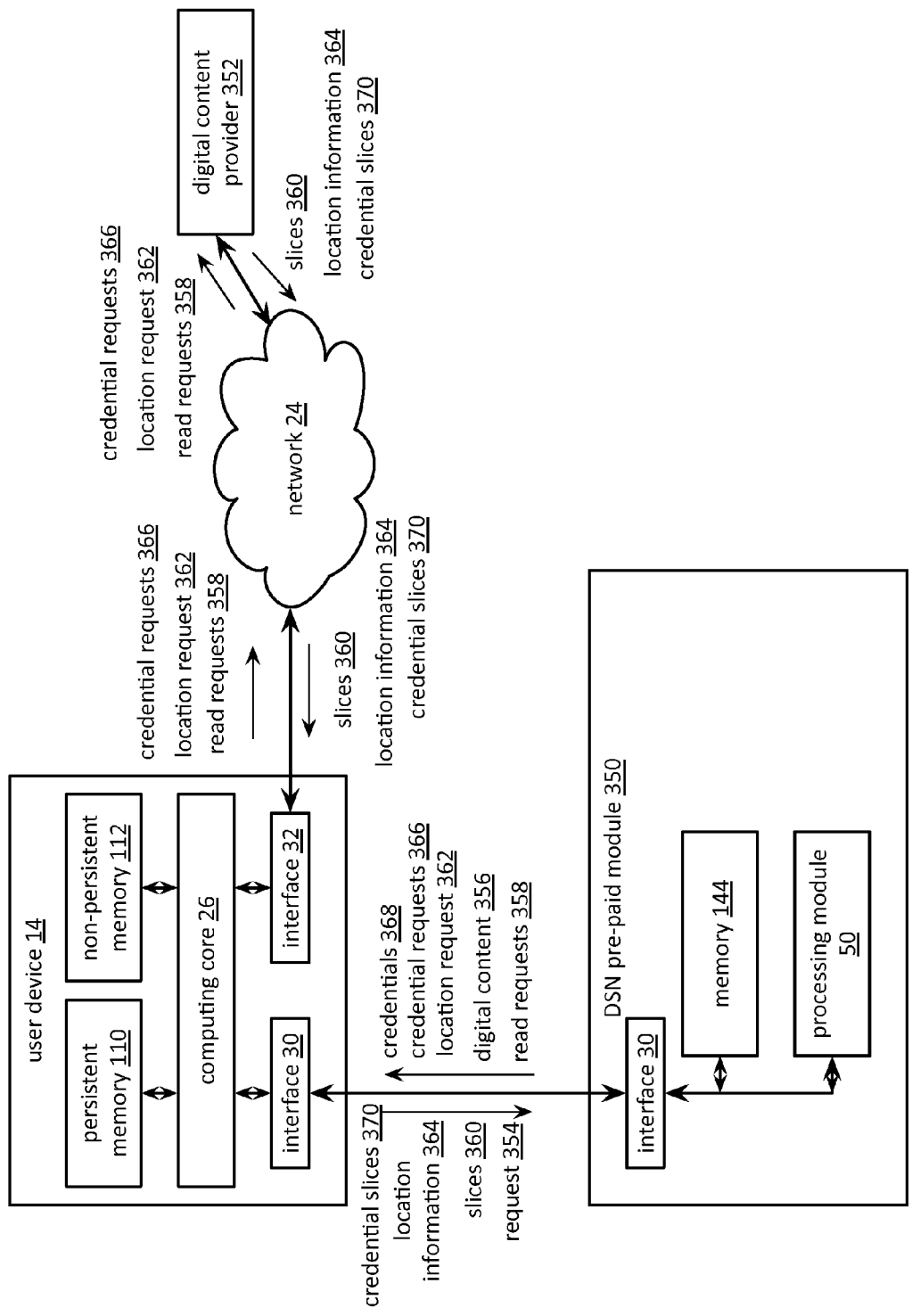
FIG. 13A is a schematic block diagram of another embodiment of a computing system in accordance with the invention.

FIG. 13A is a schematic block diagram of another embodiment of a computing system that includes a user device 14 (e.g., a computing device), a network 24, a digital content provider 352 (e.g., including a content server 106 of FIG. 6), and a dispersed storage network (DSN) pre-paid module 350. The DSN pre-paid module 350 includes an interface module 30 for interfacing with the computing device 14, a memory 144, and a processing module 50 operably coupled to the memory 144. The interface module 30 includes at least one of a universal serial bus (USB) interface module, a Bluetooth interface module, a fire-wire interface module, a 60 GHz wireless transceiver, and a Wi-Fi interface module.

When the DSN pre-paid module 350 is paired with a computing device 14, the processing module 50 is operable to receive, from the computing device 14, a request 354 to use the DSN pre-paid module 350 to acquire digital content 356 from the digital content provider 352; validate the request 354 to acquire the digital content 356; and when the request 354 to acquire the digital content 356 is validated, generate a plurality of sets of at least a threshold number of digital content read requests 358; send the plurality of sets of the at least a threshold number of digital content read requests 358 to the digital content provider 352 via the computing device 14; receive, in conjunction with (e.g., one of or both) the computing device 14, a plurality of sets of at least a decoded threshold number of encoded data slices 360; and decode, in conjunction with the computing device 14, the plurality of sets of the at least a decoded threshold number of encoded data slices 360 to produce the digital content 356. The processing module 50 is further operable to validate the request 354 to acquire the digital content by validating identity of the digital content provider 352 by at least one of determining that locally stored digital content provider identification information includes the identity of the digital content provider 352, and transceiving, via the computing device 14, a validation process to link the DSN pre-paid module 350 with the digital content provider 352.

The processing module 50 is further operable to send a storage location request 362 to the digital content provider 352 via the computing device 14, wherein the storage location request 362 is requesting information 363 regarding at least one of where the digital content 356 is stored and how the digital content 356 is stored; or access local memory 144 to determine the information 364 regarding the at least one of where the digital content 356 is stored and how the digital content 356 is stored; and generate the plurality of sets of at least a threshold number of digital content read requests 358 in accordance with the information 364 regarding the at least one of where the digital content 356 is stored and how the digital content 356 is stored. The processing module 50 is further operable to validate the request 354 to acquire the digital content by accessing a pre-paid file (e.g., from the local memory 14, from the digital content provider 352) that includes one or more of available credit, expiration criteria, identity of digital content that can be acquired, an identity of the digital content provider, and verifying that the request 354 is compliant with information of the pre-paid file.

The processing module 50 is further operable to, prior to generating the plurality of sets of the at least a threshold number of digital content read requests 358, to generate a set of credential read requests 366 to retrieve acquisition credentials 368; send the set of credential read requests 366 to the digital content provider 352 via the computing device 14; obtain, in conjunction the computing device 14, at least a threshold number of credential slices 370; decode, in conjunction with the computing device 14, the at least a threshold number of credential slices 370 to produce the acquisition credentials 368; and verify, in conjunction with the computing device 14, that the request 354 to acquire the digital content 356 is in accordance with the acquisition credentials 368. The processing module 50 is further operable to obtain the at least a threshold number of credential slices 370 by at least one of retrieving at least one of the at least a threshold number of credential slices 370 from local memory 144 of the DSN pre-paid module 350 and receiving at least some of the at least a threshold number of credential slices 370 from the digital content provider 352.

Figure 13B:
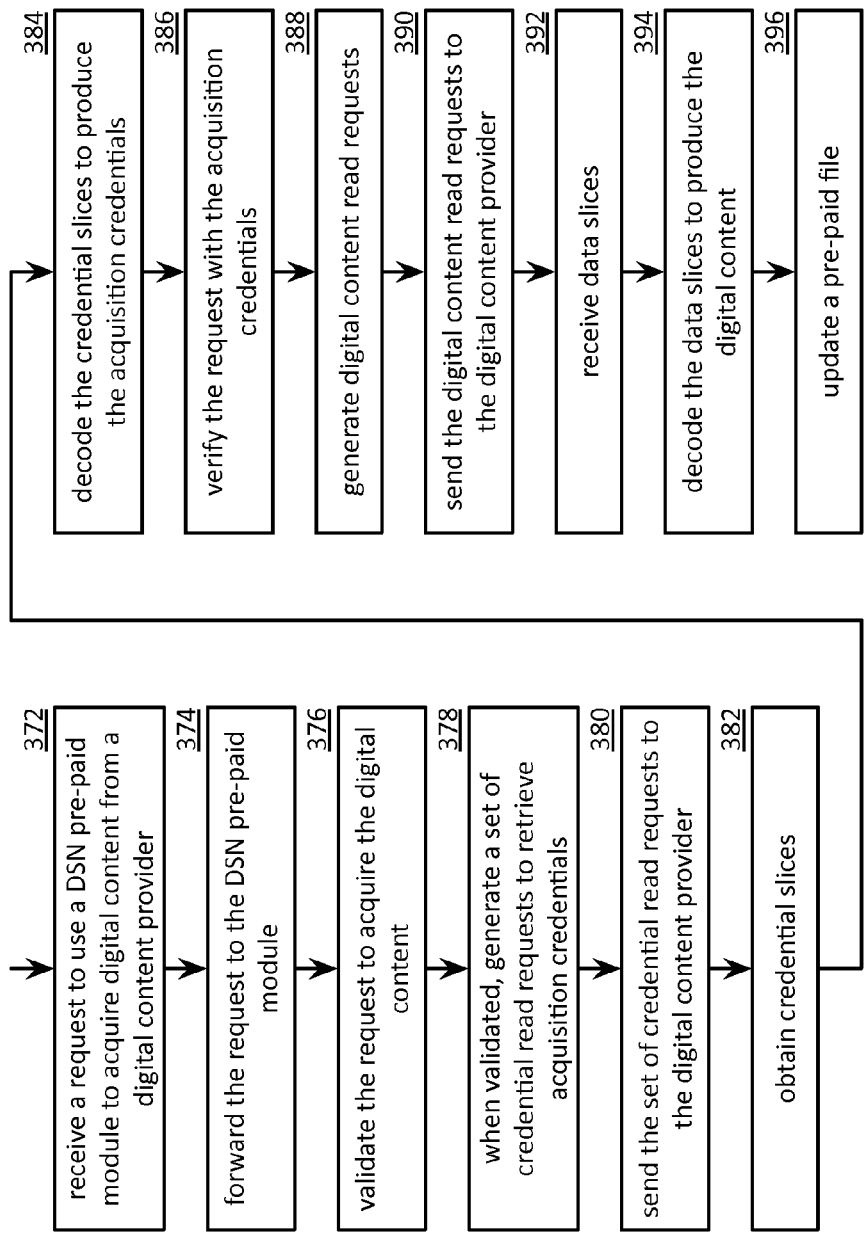
FIG. 13B is a flowchart illustrating an example of accessing a content server in accordance with invention.

FIG. 13B is a flowchart illustrating an example of accessing a content server. The method begins at step 372 where, when a computing device is paired with a distributed storage network (DSN) pre-paid module, the computing device receives a request to use the DSN pre-paid module to acquire digital content from a digital content provider. The digital content includes one or more of a specific digital content and a plurality of digital content, wherein the digital content includes a live content stream, a content file, a video file, an audio file, a video-on-demand, and audio books. The method continues at step 374 where the computing device forwards the request to the DSN pre-paid module.

The method continues at step 376 where the DSN pre-paid module validates the request to acquire the digital content. The validating the request to acquire the digital content further includes validating the identity of the digital content provider by at least one of determining that locally stored digital content provider identification information includes the identity of the digital content provider and transceiving, via the computing device, a validation process to link the DSN pre-paid module with the digital content provider. The validating the request to acquire the digital content further includes accessing a pre-paid file that includes one or more of: available credit, expiration criteria (e.g., expires in one month, expires after three views), identity of digital content that can be acquired (e.g., specific digital content), an identity of the digital content provider, and verifying that the request is compliant with information of the pre-paid file.

The method continues at step 378, when the request to acquire the digital content is validated, where the DSN pre-paid module generates a set of credential read requests to retrieve acquisition credentials. The acquisition credentials includes one or more of a signed certificate, an access credential, a key, a content server address, a content server internet protocol (IP) address, a vault identifier (ID), a source name, a slice name, a data segmentation approach, and dispersal parameters. The method continues at step 380 where the DSN pre-paid module sends the set of credential read requests to the digital content provider via the computing device.

The method continues at step 382 where at least one of the DSN pre-paid module and the computing device obtains at least a threshold number of credential slices. The obtaining the at least a threshold number of credential slices includes at least one of: retrieving at least one of the at least a threshold number of credential slices from local memory of the DSN pre-paid module and receiving at least some of the at least a threshold number of credential slices from the digital content provider. The method continues at step 384 where at least one of the DSN pre-paid module and the computing device decodes the at least a threshold number of credential slices to produce the acquisition credentials. The method continues at step 386 where at least one of the DSN pre-paid module and the computing device verifies that the request to acquire the digital content is in accordance with the acquisition credentials.

The method continues at step 388 where the DSN pre-paid module generates a plurality of sets of at least a threshold number of digital content read requests. The generating includes at least one of obtaining a signed certificate, obtaining information regarding where the digital content is stored, and obtaining information regarding how the digital content is stored. For example, the DSN pre-paid module sends a storage location request to the digital content provider via the computing device, wherein the storage location request is requesting information regarding at least one of where the digital content is stored and how the digital content is stored or accesses local memory to determine the information regarding the at least one of where the digital content is stored and how the digital content is stored and generates plurality of sets of at least a threshold number of digital content read requests in accordance with the information regarding the at least one of where the digital content is stored and how the digital content is stored.

The obtaining the signed certificate includes at least one of retrieving a DSN pre-paid module signed certificate as the signed certificate, wherein the DSN pre-paid module signed certificate was signed by the DSN pre-paid module; retrieving a digital content provider signed certificate as the signed certificate, wherein the digital content provider signed certificate was signed by the digital content provider; receiving the signed certificate from the digital content provider; and signing a certificate of the DSN pre-paid module to produce the signed certificate.

The method continues at step 390 where the DSN pre-paid module sends the plurality of sets of the at least a threshold number of digital content read requests to the digital content provider via the computing device. The method continues at step 392 where at least one of the DSN pre-paid module and the computing device receives a plurality of sets of at least a decoded threshold number of encoded data slices. The method continues at step 394 where at least one of the DSN pre-paid module and the computing device decodes the plurality of sets of the at least a decoded threshold number of encoded data slices to produce the digital content. The method continues at step 396 where the DSN pre-paid module updates the pre-paid file (e.g., lowering available credits).

Figure 13C:
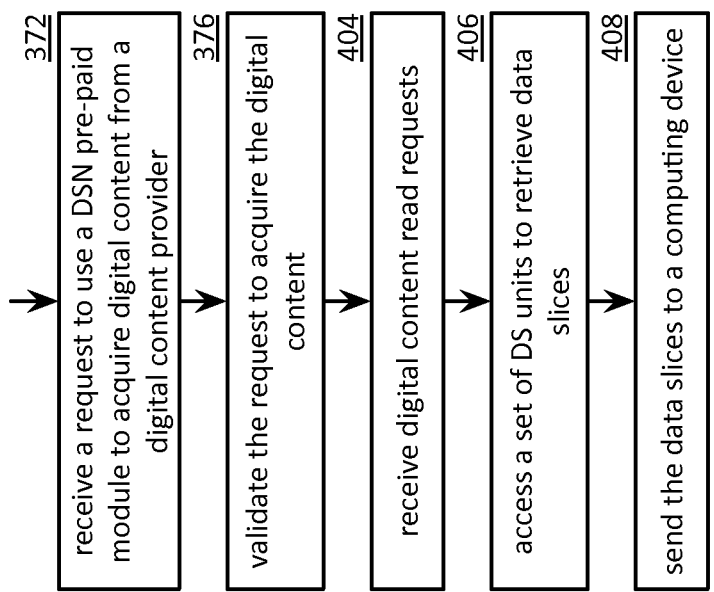
FIG. 13C is a flowchart illustrating an example of providing content in accordance with invention.

FIG. 13C is a flowchart illustrating an example of providing content, which includes similar steps to FIG. 13B. The method begins with steps 372 and 376 of FIG. 13B where a processing module (e.g., of a digital content provider) receives (e.g., from a computing device) a request to use a dispersed storage network (DSN) pre-paid module to acquire digital content from the digital content provider and validates the request to acquire the digital content. When the request to acquire the digital content is validated, the method continues at step 404 where the processing module receives a plurality of sets of at least a threshold number of digital content read requests. The method continues at step 406 where the processing module accesses a set of dispersed storage (DS) units to retrieve a plurality of sets of at least a decoded threshold number of encoded data slices, wherein the digital content is stored as a plurality of sets of encoded data slices in accordance with a DS error coding function. The method continues at step 408 where the processing module sends the plurality of sets of the at least a decoded threshold number of encoded data slices to the computing device.

Figure 14:
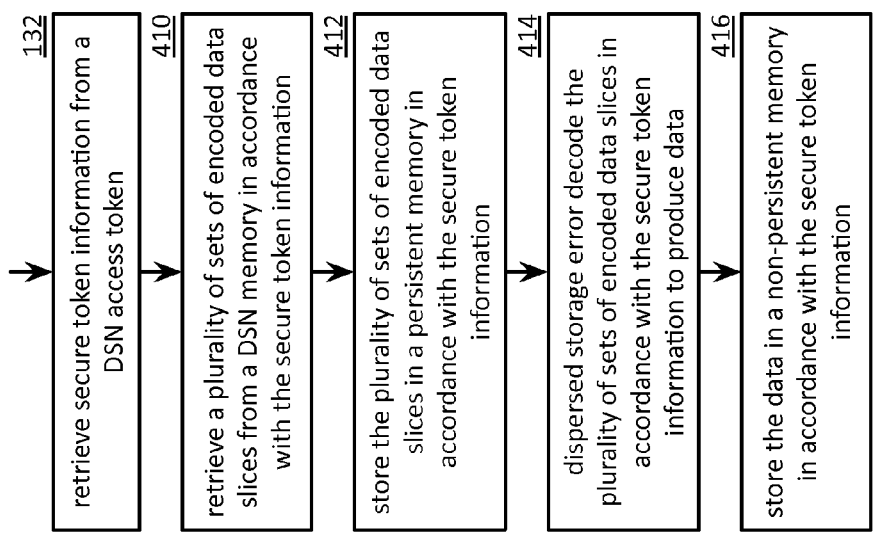
FIG. 14 is a flowchart illustrating an example of retrieving secure information in accordance with invention.

FIG. 14 is a flowchart illustrating an example of retrieving secure information, which includes similar steps to FIG. 7. The method begins with step 132 of FIG. 7 where a processing module (e.g., of a user device) retrieves secure token information from a dispersed storage network (DSN) access token. The method continues at step 410 where the processing module retrieves a plurality of sets of encoded data slices from a DSN memory in accordance with the secure token information. For example, the processing module extracts a source name from the secure token information and determines a plurality of sets of slice names in accordance with the source name. Next, the processing module sends a plurality of slice retrieval request messages to the DSN memory utilizing a DSN address of the secure token information, wherein the plurality of slice retrieval request messages include one or more of the plurality of sets of slice names, a user device identifier (ID), credential information extracted from the secure token information, and a password. Next, the processing module receives the plurality of sets of encoded data slices from the DSN memory in response to sending the plurality of request messages.

The method continues at step 412 where the processing module stores the plurality of sets of encoded data slices in a persistent memory in accordance with the secure token information. The secure token information includes slice storage rights, wherein such storage rights includes one or more of an allowed storage time duration by slice name, an allowed memory type indicator (e.g., persistent memory, non-persistent memory), a number of allowed slices indicator, an allowed segment ID, an allowed storage time duration data corresponding to the plurality of sets of encoded data slices, an amount of allowed data indicator, an allow data portion indicator, an allowed data type indicator, and an allowed pillar ID. For example, processing module stores a set of encoded data slices corresponding to segment 457 in the persistent memory when the allowed segment ID corresponds to segment 457 and the allowed memory type indicator indicates persistent memory is allowed.

The method continues at step 414 where the processing module dispersed storage error decodes the plurality of sets of encoded data slices in accordance with the secure token information to produce data. For example, the processing module dispersed storage error decodes the plurality of sets of encoded data slices utilizing dispersed storage error coding parameters of the secure token information to produce data. The method continues at step 416 where the processing module stores the data in a non-persistent memory in accordance with the secure token information. For example, the processing module stores the data in the non-persistent memory when the amount of allowed data indicator indicates 100% of the data and the allowed memory type indicator indicates non-persistent memory is allowed.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for storing data comprises:
   determining, by a computing device, where to store the data;
   when the data is to be stored in dispersed storage network (DSN) memory, managing, by a DSN access token module, a pairing between the DSN access token module and the computing device for acquiring secure token information of the DSN access token module including DSN access information to facilitate access to the DSN memory; and
   when the computing device is paired with the DSN access token module, the DSN access token module:
      receives at least a portion of the data from the computing device;
      in response to receiving the at least a portion of the data from the computing device, encodes the at least the portion of the data using a dispersed storage error encoding function in accordance with dispersed storage error coding parameters to produce one or more sets of encoded data slices; and
      sends to the computing device the one or more sets of the encoded data slices and storage information, wherein the storage information pertains to the DSN memory; and
   sending, by the computing device, the one or more sets of encoded data slices in accordance with the storage information to the DSN memory for storage therein.

2. The method of claim 1, wherein the managing the pairing comprises:
   authenticating one or more of:
   a vault identifier (ID) of the DSN memory associated with the computing device;
   an object number associated with the computing device;
   an access credential of the computing device;
   a key of the computing device;
   a user device ID associated with the computing device; and
   a password associated with the computing device.

3. The method of claim 1, wherein the managing the pairing comprises:
   determining whether the DSN access token module is actively paired to the computing device; and
   when the DSN access token module is not actively paired to the computing device, facilitating pairing of the DSN access token module to the computing device.

4. The method of claim 1, wherein the computing device sending the at least a portion of the data to the DSN access token module further comprises:
   sending, by the DSN access token module, a data segmenting command to the computing device;
   segmenting, by the computing device, the data in accordance with the data segmenting command to produce data segments; and
   sending, by the computing device, one of the data segments as the at least a portion of the data.

5. The method of claim 1, wherein determining where to store the data further comprises at least one of:
   interpreting a write request regarding the data, wherein the write request indicates storing the data in the DSN memory;
   receiving a response to a graphical user interface prompt regarding storage location of the data; and
   when the computing device is paired with the DSN access token module, indicating storage in the DSN memory.

6. The method of claim 1, wherein the storage information comprises:

a set of write requests for a set of the one or more sets of encoded data slices, wherein a write request of the set of write requests includes a slice name for a corresponding one of the encoded data slices of the set and DSN addressing information for the corresponding one of the encoded data slices.

7. A dispersed storage network (DSN) access token module comprises:
an interface module for interfacing with a computing device;
memory; and
a processing module operably coupled to the memory and operable to:
manage a pairing between the DSN access token module and the computing device for acquiring secure token information of the DSN access token module that includes DSN access information to facilitate access to the DSN memory;
when the computing device is paired with the DSN access token module, the DSN token module:
receives, via the interface module, at least a portion of data to be stored in DSN memory;
in response to receiving the at least a portion of the data to be stored in the DSN memory, encodes the at least the portion of the data using a dispersed storage error encoding function in accordance with dispersed storage error coding parameters to produce one or more sets of encoded data slices; and
sends, via the interface module, the one or more sets of the encoded data slices and storage information that pertains to the DSN memory to the computing device, wherein the storage information, when processed by the computing device, causes the computing device to send the one or more sets of encoded data slices in accordance with the storage information to the DSN memory for storage therein.

8. The DSN access token module of claim 7, wherein the interface module comprises at least one of:
a universal serial bus (USB) interface module;
a personal area network (PAN) interface module;
a serial interface module for high bandwidth communications;
a 60 gigahertz (GHz) wireless transceiver; and
a Wi-Fi interface module.

9. The DSN access token module of claim 7, wherein the managing the pairing comprises:
authenticating one or more of:
a vault identifier (ID) of the DSN memory associated with the computing device;
an object number associated with the computing device;
an access credential of the computing device;
a key of the computing device;
a user device ID associated with the computing device; and
a password associated with the computing device.

10. The DSN access token module of claim 7, wherein the managing the pairing comprises:
determining whether the DSN access token module is actively paired to the computing device; and
when the DSN access token module is not actively paired to the computing device, facilitating pairing of the DSN access token module to the computing device.

11. The DSN access token module of claim 7, wherein the receiving the at least a portion of the data further comprises:
sending a data segmenting command to the computing device that, when executed by the computing device, causes the computing device to segment the data in accordance with the data segmenting command to produce data segments; and
receiving, from the computing device, one of the data segments as the at least a portion of the data.

12. The DSN access token module of claim 7, wherein the storage information comprises:
a set of write requests for a set of the one or more sets of encoded data slices, wherein a write request of the set of write requests includes a slice name for a corresponding one of the encoded data slices of the set and DSN addressing information for the corresponding one of the encoded data slices.

13. A user device for facilitating storage of data in a dispersed storage network (DSN) memory, the user device comprises:
a first module for determining where to store the data;
when the data is to be stored in the DSN memory, a second module for managing a pairing between a DSN access token module and a computing device;
when the computing device is paired with the DSN access token module:
a third module for sending at least a portion of the data to the DSN access token module, wherein the DSN access token module is configured, in response to receiving the at least a portion of the data, to encode the at least the portion of the data received using a dispersed storage error encoding function in accordance with dispersed storage error coding parameters to produce one or more sets of encoded data slices;
a fourth module for sending, from the DSN access token module, the one or more sets of the encoded data slices and storage information pertaining to the DSN memory to the computing device; and
a fifth module for sending the one or more sets of encoded data slices in accordance with the storage information to the DSN memory for storage therein.

14. The user device of claim 13, wherein the managing of the pairing comprises providing, for authentication by the DSN access token module, at least one of:
a vault identifier (ID) of the DSN memory associated with the computing device;
an object number associated with the computing device;
an access credential of the computing device;
a key of the computing device;
a user device ID associated with the computing device; and
a password associated with the computing device.

15. The user device of claim 13, wherein the third module is further for:
receiving, from the DSN access token module, a data segmenting command to the computing device;
segmenting the data in accordance with the data segmenting command to produce data segments; and
sending one of the data segments as the at least a portion of the data.

16. The user device of claim 13, wherein the first module is further for determining where to store the data by at least one of:
interpreting a write request regarding the data, wherein the write request indicates storing the data in the DSN memory;
receiving a response to a graphical user interface prompt regarding storage location of the data; and
when the computing device is paired with the DSN access token module, indicating storage in the DSN memory.

17. The user device of claim 13, wherein the storage information comprises:

a set of write requests for a set of the one or more sets of encoded data slices, wherein a write request of the set of write requests includes a slice name for a corresponding one of the encoded data slices of the set and DSN addressing information for the corresponding one of the encoded data slices.

\* \* \* \* \*